(12) United States Patent
Pritschins et al.

(10) Patent No.: US 8,795,831 B2
(45) Date of Patent: Aug. 5, 2014

(54) WETTING AGENTS AND DISPERSANTS, THEIR PREPARATION AND USE

(75) Inventors: Wolfgang Pritschins, Wesel (DE); Karlheinz Haubennestel, Wesel (DE); Hans-Josef Teuwsen, Uedem (DE)

(73) Assignee: BYK-Chemie GmbH (DE)

( * ) Notice: Subject to any disclaimer, the term of this patent is extended or adjusted under 35 U.S.C. 154(b) by 0 days.

(21) Appl. No.: 12/863,795

(22) PCT Filed: Jan. 9, 2009

(86) PCT No.: PCT/EP2009/000074
§ 371 (c)(1),
(2), (4) Date: Oct. 19, 2010

(87) PCT Pub. No.: WO2009/103381
PCT Pub. Date: Aug. 27, 2009

(65) Prior Publication Data
US 2011/0027585 A1      Feb. 3, 2011

(30) Foreign Application Priority Data

Feb. 22, 2008   (DE) .......................... 10 2008 010 687

(51) Int. Cl.
*B32B 5/16*       (2006.01)
*C08G 18/08*      (2006.01)

(52) U.S. Cl.
USPC .............................. 428/375; 528/45; 428/403

(58) Field of Classification Search
CPC ...................................................... C08G 18/08
See application file for complete search history.

(56) References Cited

U.S. PATENT DOCUMENTS

| 4,942,213 | A * | 7/1990 | Haubennestel et al. ......... 528/28 |
| 6,437,077 | B1 * | 8/2002 | Danner ........................... 528/73 |
| 6,747,088 | B1 * | 6/2004 | Schwalm et al. ............. 524/507 |
| 2006/0155046 | A1 | 7/2006 | Moors et al. |
| 2007/0259120 | A1 | 11/2007 | Haubennestel et al. |

FOREIGN PATENT DOCUMENTS

| EP | 1 496 073 A | 1/2005 |
| EP | 1 068 254 B | 10/2005 |
| EP | 1 837 355 A | 9/2007 |

OTHER PUBLICATIONS

"International Application No. PCT/EP2009/000074, International Search Report and Written Opinion issued Jun. 2, 2009", 13 pgs.

* cited by examiner

*Primary Examiner* — Randy Gulakowski
*Assistant Examiner* — Jeffrey Washville
(74) *Attorney, Agent, or Firm* — Schwegman, Lundberg & Woessner, P.A.

(57) ABSTRACT

The invention relates to addition compounds and their salts, characterized in that the addition compounds are obtainable by reacting (a) one or more polyisocyanates having at least two isocyanate groups per molecule with (b) one or more compounds of the formula Y—(XH)$_n$ and (c) one or more compounds from the group consisting of (c1) compounds M-Q, (c2) a blocking agent for isocyanate groups, and (c3) optionally compounds of the general formula Z-Q. The invention further relates to the preparation of the addition compounds and to their use as dispersants, wetting agents and dispersion stabilizers, and also to solids coated with the addition compounds.

19 Claims, No Drawings

WETTING AGENTS AND DISPERSANTS, THEIR PREPARATION AND USE

PRIORITY CLAIM TO RELATED APPLICATIONS

This application is a national stage application under 35 U.S.C. §371 of PCT/EP2009/000074, filed Jan. 9, 2009, and published as WO 2009/103381 A1 on Aug. 27, 2009, which claims priority to German Application No. 10 2008 010 687.9, filed Feb. 22, 2008, which applications and publication are incorporated herein by reference and made a part hereof in their entirety, and the benefit of priority is claimed thereto.

The present invention relates to addition compounds and salts thereof that are suitable as wetting agents and dispersants and as dispersion stabilizers. The invention further relates to processes for preparing these addition compounds, to their use as wetting agents and dispersants and dispersion stabilizers for organic and inorganic pigments and also fillers in organic and aqueous systems, and to powder-type or fibrous solids coated with such wetting agents and dispersants and amenable to incorporation into liquid systems.

In solution or dispersion in a liquid, wetting agents lower the surface tension or interface tension and in that way increase the wetting capacity of the solution. Dispersants are suitable in general for stabilizing particulate solids in binders, paints, pigment pastes, plastics and plastic blends, for reducing the viscosity of such systems, and for improving the flow properties. Dispersion stabilizers are suitable in general for stabilizing dispersions that have already been produced.

In order to be able to incorporate solids into liquid media, high mechanical forces are necessary. It is usual to use dispersants in order to lower the dispersing forces and in order to minimize the total input into the system of energy needed to deflocculate the particulate solids, and hence also to minimize the dispersing time. Dispersants of this kind are surface-active substances of anionic, cationic or neutral structure. These substances, in a small amount, are either applied directly to the solid or added to the dispersing medium. It is also known that, following complete deflocculation of the agglomerated solids into primary particles, after the dispersing operation, there are also instances of reagglomeration, thereby completely or partly nullifying the dispersing effort. As a consequence of the inadequate dispersing and/or as a result of reagglomeration there are unwanted effects, such as viscosity increase in liquid systems, shade drift and losses of gloss in paints and coatings, and a reduction of mechanical strength in plastics.

A multiplicity of different substances are nowadays used as dispersants for pigments and fillers. Besides simple compounds of low molecular mass, such as lecithin, fatty acids and their salts, and alkylphenol ethoxylates, for example, complex structures, too, are used as dispersants. Such structures especially include amino-functional and amide-functional systems, which find broad use within the dispersants. In EP 158 406 and EP 208 041 use is made, for example, for the purpose of dispersing pigments, of amino- and amide-functional poly- and oligocopolymers based on polyamines and polycaprolactones, in which all the reactive amino groups have been converted into amide groups. These products, however, constitute complex reaction mixtures which are difficult to reproduce and have very poor solubilities in solvents and inadequate compatibilities with binders and other resins.

Good results can already be achieved with polymeric dispersants based on polyisocyanates, as are described for example in EP 0 154 678, EP 0 318 999 and EP 0 438 836. These products are prepared by addition reaction of monohydroxy compounds, diisocyanate-functional compounds and compounds having a tertiary amino group with the NCO groups of polyisocyanates containing isocyanurate, biuret, urethane and/or allophanate groups.

But the dispersants presented above often represent only partial solutions to these problems. In view of the multiplicity of organic and inorganic pigments and filling materials that are used today, sufficient stabilization of the particulate solids to be dispersed, by desorption-stable occupancy of the surface, is not adequately ensured. Consequently there are instances of agglomeration, since the efficient steric shielding that is necessary is lacking.

On account of the high quantities of such dispersants that are used, relative to the solids to be dispersed (in the case of carbon black, up to 100% of dispersant relative to pigment), it is frequently the case in the finished coating film that there are impairments affecting the intercoat adhesion and the resistance properties, especially water resistance, solvent resistance and scratch resistance.

The present invention is therefore based on the object of eliminating the above-described disadvantages of known dispersants, in other words of developing additives which, while effectively stabilizing pigments or fillers, lower the millbase viscosity of the paints, pastes or plastics formulations to an extent such that processing with a high degree of filling is possible, without detriment to the resistance properties of the cured coatings. At the same time, especially in the case of pigment pastes and filler pastes, a broad compatibility must be ensured, so that they can be used in many different binders and coating materials. Furthermore, it is necessary for the dispersing additives of the invention that are used to allow the pastes, or the binders prepared with these pastes, to be mixed with one another without flocculation.

A further aim is to provide dispersing additives which also act as wetting agents. Lastly, the additives provided ought also to act as dispersion stabilizers, especially as emulsion stabilizers.

Surprisingly it has become apparent that a marked improvement in the resistance properties in conjunction with effective dispersing and stabilizing of pigments or filler particles in binders, pigment pastes or plastics formulations can be achieved if the addition compounds of the invention, described below, are used.

These addition compounds, furthermore, are of surprisingly broad compatibility and can be used as dispersants and/or dispersion stabilizers both in polar and in apolar binder systems. They strongly lower the viscosity of the millbase during dispersing and so make it possible to prepare formulations having a high solids fraction. The addition compounds of the invention are also effective wetting agents.

The objective is achieved through the provision of addition compounds and salts thereof, which are obtainable by reacting (a) one or more polyisocyanates having at least two isocyanate groups per molecule with
(b) one or more compounds of the formula (I)

$$Y-(XH)_n \qquad (I)$$

where
XH is a group that is reactive towards isocyanates and
Y is a monomeric or polymeric group that is not reactive towards isocyanates, that contains no tertiary amino groups and no hydrolysable silane groups and that comprises one or more aliphatic, cycloaliphatic and/or aromatic groups,
and where
n is 1, 2 or 3, the compound of the formula (I) possessing a number-average molar mass $M_n$ of less than 20 000 g/mol and not representing a compound which falls within the definition of component (c2), and where for at least 50 mol % of the compounds of the formula (I) it is the case that n is 1, with the proviso that 20% to 90% of the isocyanate groups of component (a) are reacted with the compounds of the formula (I), and (c) one or more compounds from the group consisting of
(c1) compounds of the formula (II)

$$M\text{-}Q \quad (II)$$

in which

M is an organic radical having a number-average molar mass of not more than 1000 g/mol which contains
i) at least one tertiary amino group and at least one hydroxyl group or
ii) at least one hydrolysable silane group with the proviso that for 100% of the compound of the general formula (I) n is 1, and Q is $NH_2$, OH or NHR, in which R is a linear or branched alkyl group having 1 to 18 carbon atoms, (c2) a blocking agent for isocyanate groups, and (c3) optionally compounds of the general formula (III)

$$Z\text{-}Q \quad (III)$$

in which

Z is an organic basic radical having at least one tertiary amino group and contains no NCO-reactive groups, and Q is $NH_2$, OH or NHR, in which R is a linear or branched alkyl group having 1 to 18 carbon atoms, where, if desired, any hydroxyl groups present in the reaction product of (a), (b) and (c) are reacted with polycarboxylic acids having at least two carboxyl groups or their anhydrides in an amount such that at least 0.8 molecule of the polycarboxylic acid or of the polycarboxylic anhydride is used for each hydroxyl group to be reacted;

subject to the proviso that at least 10%, preferably 20%, more preferably 40%, of the isocyanate groups of component (a) are reacted with component (c) and use is made as component (c) of at least 5 mol % of one or more of components (c1) and/or (c2), and that 0% to 50%, preferably 0% to 35%, more preferably 0% of the isocyanate groups of component (a) are reacted with one or more components (c3).

Component (a)

For preparing the addition compounds of the invention use is made as component (a) of polyisocyanates having at least two isocyanate groups per molecule.

Isocyanates of this kind are known from the prior art in the present technical field.

The compounds in question are more preferably oligomeric or polymeric derivatives of monomeric diisocyanates that contain biuret, urethane, uretdione and/or isocyanurate groups. Monomeric diisocyanates of this kind are, for example, 1,4-diisocyanatobutane, hexamethylene diisocyanate (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, tolylene diisocyanate (TDI), 1-isocyanato-1-methyl-4(3)-isocyanatomethylcyclohexane, bis(isocyanatomethyl)norbornane and 1,3- and 1,4-bis(2-isocyanatoprop-2-yl)benzene (TMXDI) or mixtures of such diisocyanates. Alternatively, the stated monomeric isocyanates may be used as they are, alone or in a mixture, or in a mixture with their oligomeric or polymeric derivatives containing biuret, urethane, uretdione and/or isocyanurate groups. In accordance with the invention it is possible to use one or more monomeric, oligomeric or polymeric polyisocyanates.

The polyisocyanates must possess an average functionality of at least 2. The average functionality is preferably at least 2.5 and more preferably at least 3. Particular preference is given to the above-described derivatives of HDI, TDI and/or IPDI, and especially those of TDI.

Examples of polyisocyanates of this kind are those which are obtainable, for example, by addition of diisocyanates with polyols such as Desmodur L from Bayer, or those obtainable by biuret reaction from diisocyanates, such as the commercial product Desmodur N from Bayer, or else the polyisocyanates with an isocyanurate parent structure that are obtainable by cyclization of diisocyanates, such as the commercial products Desmodur HL and Desmodur IL from Bayer, the commercial products Polurene KC or Polurene HR from SAPICI, or trimeric isophorone diisocyanate (isocyanurate T1890 from Chemische Werke Huls). Further examples of polyisocyanates available as commercial products are Desmodur VL (polyisocyanate based on diphenylmethane diisocyanate (MDI), Bayer AG), Desmodur Z4370 (polyisocyanate based on isophorone diisocyanate (IPDI), Bayer AG), Desmodur N3400 (aliphatic HDI uretdione, Bayer AG), Thanecure T9 (aromatic TDI uretdione, TSE Industries), Crelan VP LS 2147 and Crelan VP LS 2347 (aliphatic IPDI uretdiones, Bayer AG), Polurene KD (polyisocyanurate based on tolylene diisocyanate (TDI), SAPICI), Uronal RA.50 (polyisocyanurate based on TDI, from Galstaff), Polurene A (polyisocyanate based on TDI trimethylolpropane (TMP), SAPICI), Polyurene MC (polyisocyanate based on TMP-IPDI, SAPICI), Polyurene MD.70 (polyisocyanate based on TMP-TDI-MDI, SAPICI). These commercial products are frequently not in the pure form of a polyisocyanate, but instead in the form of mixtures of polyisocyanates of similar structure. As polyisocyanates in the present invention it is preferred to use trimerization products of diisocyanates based on hexamethylene diisocyanate (HDI), isophorone diisocyanate (IPDI) and/or tolylene diisocyanate (TDI).

By the abovementioned "average functionality of at least 2" is meant that in terms of the isocyanate groups the commercial products have the stated functionality of at least 2. "Functionality of 3", for example, means that a molecule contains on average 3 free isocyanate groups.

The average functionality can be determined experimentally by determining the number-average molecular weight $M_n$ and the NCO number as described in the example section of the present invention, and calculating therefrom the NCO equivalent weight. The average functionality is the ratio formed from the number-average molecular weight and the NCO equivalent weight. Preferably, the average functionality is 2.5 to 10, more preferably 3 to 6.

Component (b)

The polyisocyanates of component (a) are reacted in accordance with the invention with compounds of component (b) of the above formula (I).

The compounds of the formula (I) are characterized in that they contain one, two or three groups XH that are reactive towards isocyanate groups. The compounds of the formula (I)

react irreversibly via their reactive XH groups with the isocyanates. "Irreversibly", in this context means that the compounds of the formula (I) cannot be cleaved off again like a blocking agent (thermally, for example). Accordingly, after the reaction with the XH group of the compound of the formula (I), the isocyanate groups of the polyisocyanate are not available for further reactions. Therefore, in particular, the compounds of component (C2) are excluded from consideration as compounds of the formula (I).

For the Y group of the compound of the general formula (I), it is the case that it is not reactive towards isocyanates, i.e. that they contain no active hydrogen atoms according to Zerewitinoff. This means in particular that the group Y is free from the above-mentioned groups XH and is also not capable of the reversible blocking of isocyanate groups.

Examples of XH are OH, $NH_2$, NHR, SH or COOH, R being a branched or unbranched alkyl group having 1 to 18 carbon atoms. Preferably XH is OH, $NH_2$ or NHR. With particular preference these functional groups are hydroxyl groups, since these compounds are readily obtainable and/or available commercially and the resulting reaction products are highly soluble in solvents which are employed in the context of the later use of the additives in accordance with the invention.

The groups Y that are not reactive towards isocyanates may contain the heteroatoms O, S, Si and/or N and/or ether, urethane, carbonate, amide and/or ester groups. In the groups Y it is possible for halogen, preferably fluorine and/or chlorine, to be substituted for hydrogen.

As compounds of the formula (I) it is possible to use aliphatic, cycloaliphatic and/or araliphatic compounds. It is also possible to use mixtures of such compounds, in other words, at least two different compounds of the formula (I). The aliphatic or araliphatic compounds of the formula (I) may be straight-chain or branched. They may be saturated or unsaturated. Saturated compounds are preferred, however.

Examples of compounds of the formula (I) are straight-chain or branched alcohols such as methanol, ethanol, butanol, ethylhexanol, decanol, isotridecyl alcohol, lauryl alcohol, stearyl alcohol, isobornyl alcohol, benzyl alcohol, propargyl alcohol, oleyl alcohol, linoleyl alcohol, oxo alcohols, neopentyl alcohol, cyclohexanol, fatty alcohols, alkylphenols, monophenyl diglycol, alkylnaphthols, phenylethanol, hydroxyl-functional vinyl compounds such as, for example, hydroxybutyl vinyl ether, hydroxy-functional acrylates or methacrylates such as, for example, hydroxyethyl acrylate, hydroxyethyl methacrylate, hydroxybutyl (meth) acrylate and hydroxyethylethyleneurea, and also polyolefin polyols, such as unhydrogenated or hydrogenated, hydroxy-functional polybutadienes, polypropylenes, ethylene/butylene copolymers or polystyrenes having an average functionality of 1 to 3. Examples of corresponding commercial products are the hydroxy-terminated hydrogenated polybutadienes, available under the name Polytail® from Mitsubishi Chemical, or the hydroxy-terminated ethylene/butylene copolymers Kraton® Liquid L-1203, L-1302 and L-2203 from Kraton Polymers, or the liquid polybutadienes available as NISSO-PB from Nippon Soda Co., or the saturated, long-chain, linear, largely primary alcohols available from Baker Petrolite as Unilin® alcohols, having chain lengths of up to $C_{50}$ and molecular weights of 375 to 700 g/mol, and their ethoxylates, which are obtainable under the Unithox® name. Further examples are described inter alia in EP-A-154 678.

As compounds of the formula (I) it is also possible to use those which contain ester, ether, urethane, carbonate, amide and/or siloxane groups or combinations of these groups. They may therefore, for example, be polyethers, polyesters, polyurethanes, polycarbonates, polysiloxanes or, for example, mixed polyether-polyesters.

Polyesters can be prepared for example by reacting dicarboxylic acids and also their esterifiable derivatives such as, for example, anhydrides, acid chlorides or dialkyl esters such as dimethyl esters or diethyl esters by reaction with diols and mono-, di- or tri-functional starter components. The formation of dihydroxy polyesters can be suppressed if required by using correspondingly stoichiometric amounts of monohydroxy compounds, as have been described above. The esterification may be carried out in bulk or else by means of azeotropic esterification in the presence of an entraining agent. Examples of dicarboxylic acids are succinic acid, maleic acid, fumaric acid, glutaric acid, adipic acid, sebacic acid, pimelic acid, phthalic acid or dimerized fatty acids and their isomers and hydrogenation products. Examples of diols are as follows: ethylene glycol, 1,2-propanediol, 1,3-propanediol, 1,4-butanediol, 1,6-hexanediol, neopentyl glycol, cis-1,2-cyclohexanedimethanol, trans-1,2-cyclohexanedimethanol, and also polyglycols based on ethylene glycol or propylene glycol.

Preferred polyesters of the formula (I) are polyesters which can be obtained by polycondensation of one or more, optionally alkyl-substituted, hydroxy carboxylic acids and/or ring-opening polymerization of the corresponding lactones such as propiolactone, valerolactone or caprolactone, for example, by means of a mono-, di- or tri-hydroxy starter component, as described in EP-A-154 678 (U.S. Pat. No. 4,647,647). Preferably they possess a number-average molecular weight $M_n$ of 150 to 5000 g/mol. As a starter component it is possible in principle to use any compounds other than those given as compounds of the formula (I). The mono-, di- or tri-functional alcohols used as starter components possess preferably 1 to 30, more preferably 4 to 14, carbon atoms. Mentioned by way of example are n-butanol, longer-chain, saturated and unsaturated alcohols, such as propargyl alcohol, oleyl alcohol, linoleyl alcohol, oxo alcohols, cyclohexanol, phenylethanol, neopentyl alcohol, ethylene glycol, propylene glycol and glycerol, and also fluorinated alcohols, hydroxy-functional polydialkylsiloxanes, hydroxy-functional vinyl compounds such as, for example, hydroxybutyl vinyl ether, hydroxy-functional acrylates or methacrylates such as, for example, hydroxyethyl acrylate, hydroxyethyl methacrylate, hydroxybutyl (meth)acrylate, hydroxy-functional polyalkylene glycol acrylates and methacrylates. It is also possible to convert alcohols of the above-described kind and substituted and unsubstituted phenols, by alkoxylation in accordance with known processes, using alkylene oxides such as, for example, ethylene oxide, propylene oxide, butylene oxide and/or styrene oxide, into polyoxyalkylene monoalkyl, polyoxyalkylene monoaryl, polyoxyalkylene monoaralkyl and polyoxyalkylene monocycloalkyl ethers and to use these hydroxy polyethers in the manner described above as starter components for the lactone polymerization. In each case it is also possible to use mixtures of the aforementioned compounds. The lactone polymerization is carried out by known methods, initiated by p-toluenesulphonic acid or dibutyltin dilaurate, for example, at temperatures of about 70° C. to 180° C. Particular preference is given to polyesters based on ε-caprolactone, in combination if desired with δ-valerolactone.

As compounds of the formula (I) it is also possible to use mono-, di- or tri-hydroxy polyethers. These can be obtained, for example, by alkoxylating the other compounds described as compounds of the formula (I), such as alkanols, cycloalkanols, phenols or the above-described hydroxy polyesters with alkylene oxides such as ethylene oxide, propylene oxide, butylene oxide, styrene oxide or mixtures thereof. Mixed polyethers may be arranged randomly as a gradient or in blocks. These polyethers advantageously have a number-average molecular weight ($M_n$) in the range from about 100 to 10 000, preferably from 150 to 5000 and more preferably from 200 to 3500 g/mol. Preference is given to polyethers based on ethylene oxide, propylene oxide and mixtures thereof. Further preferred are monohydroxy-functional polyoxyalkylene monoalcohols such as allyl polyethers, for example Polyglycol A 350, Polyglycol A 500, Polyglycol A 1100, Polyglycol A 11-4, Polyglycol A 20-10 or Polyglycol A 20-20 from Clariant AG or Pluriol® A 010 R, Pluriol® A 11 RE, Pluriol® A 13 R, Pluriol® A 22 R or Pluriol® A 23 R from BASF AG, vinyl polyethers, for example Polyglycol V 500, Polyglycol V 1100 or Polyglycol V 5500 from Clariant AG, polyoxyethylene monoalcohols prepared starting from methanol, such as Pluriol® A 350 E, Pluriol® A 500 E, Pluriol® A 750 E, Pluriol® A 1020 E, Pluriol® A 2000 E or Pluriol® A 5010 E from BASF AG, polyoxypropylene monoalcohols prepared starting from alkanol, such as Polyglycol B01/20, Polyglycol B01/40, Polyglycol B01/80, Polyglycol B01/120 or Polyglycol B01/240 from Clariant AG or Pluriol® A 1350 P or Pluriol® A 2000 P from BASF AG, and polyalkoxylates started using different fatty alcohols and having a variable degree of alkoxylation, of the kind known to the skilled worker under the trade names Lutensol® A, Lutensol® AT, Lutensol® AO, Lutensol® TO, Lutensol® XP, Lutensol® XL, Lutensol® AP and Lutensol® ON from BASF AG. Preference is given to using polyoxyalkylene monoalcohols which contain ethylene oxide and/or propylene oxide and/or butylene oxide groups and which may have been modified with styrene oxide. Particular preference is given to using polyoxyalkylene monoalcohols such as, for example, Polyglycol B 11/50, Polyglycol B 11/70, Polyglycol B 11/100, Polyglycol B 11/150, Polyglycol B 11/300 or Polyglycol B 11/700 from Clariant AG, Pluriol® A 1000 PE, Pluriol® A 1320 PE, or Pluriol® A 2000 PE from BASF AG or Terralox WA 110 from DOW Chemicals, which are polyoxyalkylenes prepared starting from butanol, formed from ethylene oxide and propylene oxide, and with a terminal OH group.

Preferred compounds of the formula (I) are hydroxy-functional polyethers, hydroxy-functional polyesters, hydroxy-functional polyether-polyesters and/or aliphatic and/or cycloaliphatic alcohols having 2 to 30 carbon atoms, some of whose hydrogen atoms may have been replaced by halogen and/or aryl radicals.

As compounds of the formula (I) it is also possible to use mono-, di- or tri-functional polysiloxanes such as, for example, amino- or hydroxy-functional polydialkylsiloxanes containing hydroxyl groups not attached to silicon atoms, or to use aminoalkylpolysiloxanes, which where appropriate may have been polyether-modified and/or polyester-modified. In this case the respective amino-functional compounds carry primary or secondary, but not tertiary, amino groups. It is preferred to use hydroxyalkylpolydimethylsiloxanes having number-average molecular weights $M_n$ of 400 to 8000 g/mol, more preferably 400 to 5000 g/mol and very preferably 400 to 2000 g/mol.

As compounds of the formula (I) it is also possible to use polyurethanes, polyether-polyurethanes, polyester-polyurethanes and/or polyether-polyester-polyurethanes, which can be obtained by addition reaction of diisocyanates with dihydroxy compounds in the presence of mono-, di- or tri-functional starter components.

As a diisocyanate for synthesizing the compounds of formula (I) that contain urethane groups it is possible to use the aliphatic, cycloaliphatic and/or aromatic diisocyanates known per se from polyurethane chemistry and having 4 to 15 carbon atoms, such as tetramethylene, hexamethylene, trimethylhexamethylene, dodecamethylene, isophorone, tolylene and diphenyl-methane diisocyanates, methylenebis(4-cyclohexyl isocyanate) or 1,4-cyclohexanebis(methyl isocyanate). As hydroxy compounds for synthesizing the compounds of formula (I) that contain urethane groups it is preferred to use diols having 2 to 12 carbon atoms, polyoxyalkylene glycols and dihydroxy-functional polyesters having preferred number-average molecular weights $M_n$ of not more than 2000 g/mol. As monohydroxy-functional starter component it is possible to use alcohols having up to 30 carbon atoms, such as are described for preparing the polyesters of formula (I), but also the hydroxy polyesters and hydroxy polyethers that are described as a compound of formula (I). The polyesters possess preferably a number-average molecular weight $M_n$ of 300 to 5000 g/mol, and the polyethers from 200 to 2000 g/mol.

The radical Y can contain carbonate groups such as are obtained by reaction with open-chain and/or cyclic carbonates in accordance with the prior art. Suitability is possessed for example by carbonate-modified linear polyesters or polycarbonate diols such as are used in preparing polyurethane. Examples are described in U.S. Pat. No. 4,101,529, EP 0358 555, or WO 02/085507. Suitable carbonates are, for example, aliphatic, cycloaliphatic, araliphatic and/or aromatic esters of carbonic acid, such as dialkyl carbonates such as dimethyl carbonate, diethyl carbonate or diphenyl carbonate, for example, catechol carbonate or cyclic alkylene carbonates. Particular suitability is possessed by cyclic alkylene carbonates having 5- or 6-membered rings, which if desired may be substituted. Preferred substituents are aliphatic, cycloaliphatic and/or aromatic groups having up to 30 carbon atoms. Examples of suitable cyclic alkylene carbonates are ethylene carbonate, propylene carbonate, glyceryl carbonate, trimethylene carbonate, 4-methyltrimethylene carbonate, 5-methyltrimethylene carbonate, 5,5-dimethyltrimethylene carbonate, 5,5-diethyltrimethylene carbonate or 5-methyl-5-propyltrimethylene carbonate.

The radical Y may carry further groups which behave inertly during the formation of the adduct, such as, for example the carboxamide group (—NHCO—), unactivated double bonds or urea groups (—NHCONH—). The fraction of these compounds of the formula (I) that carry such groups should preferably be below 50 mol %, more preferably below 5 mol %, based on all of the compounds used of the formula (I). Particularly preferred compounds are those containing none of these groups at all.

The ester, ether, urethane, carbonate and/or siloxane groups that may be present can be in a block structure (preferably poly(ethylene oxide-block-propylene oxide-block-epsilon-caprolactone), form a gradient or else be arranged randomly.

As a compound of the formula (I) it is also possible to use polyacrylic esters and/or polymethacrylic esters having on average up to three NCO-reactive groups, such as are obtained by anionic, cationic or free-radical polymerization of acrylic esters and/or methacrylic esters. Preference is given to monohydroxy-functional compounds. Monohydroxy-functional polyacrylic esters and polymethacrylic esters are those containing on average one hydroxyl group in the molecule. Such compounds have already been used in the present field of the art for preparing other dispersants. Compounds of this kind are described for example in U.S. Pat. No. 4,032,698 or EP 318 999. Such polyacrylates have preferably a number-average molecular weight $M_n$ of 300 to 20 000 g/mol, more preferably 500 to 10 000 g/mol. They can be arranged in a block structure or else randomly or form a gradient.

The carboxyl group of the monomeric acrylates or methacrylates can be esterified with, for example, aliphatic, cycloaliphatic and/or aromatic alcohols such as methanol, butanol, cyclohexanol, 2-ethylhexanol, lauryl, stearyl, isobornyl or benzyl alcohol or with ether alcohols such as 2-methoxyethanol, 2-phenoxyethanol, tetrahydrofurfuryl alcohol, or glycidol, with polyester alcohols such as hydroxy-functional polycaprolactone, or with alkoxypolyalkylene glycols such as methoxypolyethylene glycol or methoxypolypropylene glycol. The number-average molecular weight $M_n$ of the esterification component is preferably below 2000 g/mol. For preparing the hydroxy-functional polyacrylates or polymethacrylates it is also possible to use mixtures of different monomers described above. For preparing these polyacrylates or polymethacrylates it is also possible as comonomers to use vinyl esters such as vinyl acetate, vinyl ethers such as vinyl ethyl ether, styrene, vinyltoluene and/or vinylcyclohexane. The resulting copolymers have been synthesized from preferably not more than 50 mol % of comonomers that have no acrylic functionality.

Hydroxy-functional poly-2-alkyl-2-oxazolines or poly-2-alkyl-2-oxazines can also serve as a compound of the formula (I). Monohydroxy-functional compounds are used with preference. As the person skilled in the art is aware, poly-2-alkyl-2-oxazolines or poly-2-alkyl-2-oxazines are obtained by cationic, ring-opening polymerization of 2-alkyl-2-oxazolines or 2-alkyl-2-oxazines with initiators such as para-toluenesulphonic acid, methyl tosylate or methyl triflate, for example.

The oxazolinium or oxazinium end groups that result from the living cationic polymerization mechanism can be converted by alkaline hydrolysis via amino ester end groups into the more stable hydroxy amides. An alternative route to the preparation of monohydroxy-functional poly-2-alkyl-2-oxazolines or poly-2-alkyl-2-oxazines is the polymerization with 2-(4-hydroxyphenyl)-N-methyl-2-oxazolinium trifluoro-methanesulphonate as the initiating species (A. Groβ, G. Maier, O, Nuyken, Macromol. Chem. Phys. 197, 2811-2826 (1996)). Through the choice of the alkyl substituent it is possible to control the compatibility. For example, the water-solubility of poly-2-ethyl-2-oxazoline makes it suitable for highly polar systems, whereas poly-2-lauryl-2-oxazoline, for example, is compatible in apolar systems. Where block copolymers are formed from 2-ethyl-2-oxazoline and 2-lauryl-2-oxazoline, the polymers are notable for a particularly broad compatibility. Such poly-2-alkyl-2-oxazolines or poly-2-alkyl-2-oxazines possess preferably a number-average molecular weight $M_n$ of 300 to 20 000 g/mol, more preferably 500 to 10 000 g/mol.

In applications requiring a broad compatibility, as in the universal paste sector, for example, it is frequently advantageous to use addition compounds which are prepared with mixtures of different compounds of the formula (I). Where, for example, the addition compounds of the invention are to be used in universal tinting pastes for aqueous and apolar systems, the combination of water-soluble with apolar compounds of the formula (I) is an advantage.

The number-average molecular weight $M_n$ of the compound of the formula (I) is smaller than 20 000 g/mol and is preferably not more than 10 000 g/mol, more preferably not more than 5000 g/mol, very preferably not more than 3500 g/mol, and better still not more than 2000 g/mol. The minimum molecular weight $M_n$ is preferably 100 g/mol, more preferably 150 g/mol, very preferably 200 g/mol, and most preferably 400 g/mol. Preferably less than 50 mol % of the compounds used, according to formula (I), ought to possess a number-average molecular weight of less than 100 g/mol, more preferably less than 25 mol %, very preferably less than 15 mol % and most preferably 0 mol %.

In the reaction with the monofunctional compounds of the formula (I) 15% to 90%, preferably 20% to 70% and more preferably 25% to 60% of the free NCO groups originally used are reacted.

Examples of di- or trifunctional compounds of the formula (I) are diols and triols and, respectively, diamines and triamines without tertiary amino groups having 2 to 12 carbon atoms, dihydroxydialkyl sulphides and dihydroxy sulphones. Examples are butanediol, hexanediol, cyclohexanedimethanol, neopentyl glycol, ethylene glycol, glycerol, trimethylolpropane, fatty acid dialkanol amides, thiodiglycol di(4-hydroxyphenyl) sulphone, and also hydroxy-functional polybutadienes having an average functionality of 2 to 3. One preferred group of compounds of the formula (I) are polyoxyalkylene glycols advantageously having alkylene groups having 2 to 4, preferably 2, carbon atoms, and preferably having number-average molecular weights $M_n$ in the range from 200 to 2000 g/mol and more preferably 400 to 1500 g/mol. Ethoxylates with 3 hydroxyl groups are obtained, for example, by polymerization using trifunctional alcohols as a starter component. Preferred polyoxyalkylene glycols are polyethylene glycols.

As di- or tri-functional compounds of the formula (I) it is also possible to use those which can be obtained by polymerizing one or more lactones, preferably epsilon-caprolactone, as already mentioned, by means of di- or tri-hydroxy starter components. Preferably these polyesterpolyols have a number-average molecular weight $M_n$ of 500 to 2000 g/mol. A preferred starter component is butanediol or ethylene glycol. Also suitable, however, are the abovementioned diols or triols as suitable starter components.

In one preferred embodiment, the polyfunctional compounds of the formula (I) are di- or trifunctional polyethers, polyesters or polyether-polyesters.

As polyfunctional compounds of the formula (I) it is also possible to use polyurethanes, polyether-polyurethanes, polyester-polyurethanes and/or polyether-polyester-polyurethanes, which can be obtained by addition reaction with a diisocyanate with a dihydroxy compound in analogy to the corresponding monofunctional compounds according to formula (I). Preferably these urethane-containing compounds according to formula (I) have an average functionality of not more than 2 and a number-average molecular weight of 300 to 2500 g/mol, preferably of 500 to 1500 g/mol.

The di- or tri-functional compounds of the formula (I) produce crosslinking between the reaction products of polyisocyanate and monofunctional compounds of the formula (I). The starting products can be used for example in amounts such that the di- or trifunctional compounds of the formula (I) constitute the centre of the molecule, and such that attached to them are the polyisocyanates whose remaining isocyanate groups have been or are reacted with monofunctional compounds of the formula (I). It is of course also possible for a certain overcrosslinking or undercrosslinking to be present.

In the case of the reaction with the di- or tri-functional compounds of the formula (I) it is the case that 0% to 45% and preferably 0% to 25% of the NCO groups originally used are reacted. Particularly preferred products are obtained entirely without the use of di- or tri-functional compounds of the formula (I).

In total at least 20%, more preferably at least 25%, and not more than 90%, preferably not more than 80%, more preferably not more than 70%, of the NCO groups of the component (a) polyisocyanate that were originally used are reacted with the compounds of the formula (I).

The reaction of the polyisocyanates with different compounds of the formula (I) can be carried out in one single reaction step or in two or more reaction steps in succession. This can take place in any order. In many cases, however, it is advantageous to react the polyisocyanate in succession with the components in the order first of monofunctional and then of polyfunctional compounds. The isocyanate addition can take place, depending on the reactivity of the individual reactants, within the temperature range that is customary for this kind of reaction, from room temperature up to about 150° C. For the purposes of acceleration and reduction of side reactions it is possible to use the customary prior art catalysts such as tertiary amines, for example triethylamine, dimethylcyclohexylamine, N-methylmorpholine, N,N'-dimethylpiperazine, 2-(dimethylaminoethoxy)ethanol, diazabicyclo[2.2.2]octane and similar compounds, and also, in particular, organometallic compounds such as titanic esters, iron compounds such as iron(III) acetylacetonate, for example, tin compounds, such as tin diacetate, tin dioctoate, tin dilaurate or the dialkyl derivatives of tin dialkyl salts of aliphatic carboxylic acids such as dibutyltin diacetate, dibutyltin dilaurate or the like, for example. These catalysts are customarily used in amounts of 0.0001 to 0.1 part by weight per 100 parts by weight of polyisocyanate.

Component (c)
Component (c1)

Compounds M-Q according to formula (II) that are used are compounds in which M is an organic radical having a number-average molar mass of not more than 1000 g/mol, preferably not more than 500 g/mol and more preferably 300 g/mol, containing i) at least one tertiary amino group and at least one OH group or ii) at least one hydrolysable silane group, and in which Q is $NH_2$, NHR or OH (where R is a linear or branched alkyl group having 1 to 18 carbon atoms).

In case i) M preferably contains 1 to 10, more preferably 1 to 5 and very preferably 1 to 3, most preferably 1 to 2, OH groups. Primary OH groups are preferred.

Examples of M-Q with tertiary amino groups and OH groups are triethanolamine, N-methyldiethanolamine, aminopropylmethylethanolamine, 3-(diethylamino)propane-1,2-diol, tetrakis(2-hydroxypropyl)ethylenediamine, bis(2-hydroxyethyl)dodecylamine, and bis(2-hydroxyethyl)octadecylamine.

In the case of the compounds M-Q having at least one hydrolysable silane group, M is preferably of the group —$R^a$—$Si(OR^b)_m(R^c)_{3-m}$, where $R^a$ is an alkylene radical having 1 to 12 carbon atoms, a cycloalkylene radical having 4 to 6 carbon atoms or an arylene radical having 6 to 10 carbon atoms, and $R^b$ and $R^c$ are alkyl groups having 1 to 10 carbon atoms and m is 1 to 3.

As a compound M-Q containing at least one hydrolysable silane group it is preferred to select at least one compound from the group encompassing 3-(N-allylamino)propyltrimethoxysilane, 4-aminobutyltriethoxysilane, 1-amino-2-(dimethylethoxysilyl)propane, N-(2-aminoethyl)-3-aminoisobutyldimethylmethoxysilane, N-(2-aminoethyl)-3-aminoisobutylmethyldimethoxysilane, (aminoethylaminomethyl)phenethyltrimethoxysilane, N-(2-aminoethyl)-3-aminopropylmethyldimethoxysilane, N-(2-aminoethyl)-3-aminopropyltriethoxysilane, N-(2-aminoethyl)-3-aminopropyltrimethoxysilane, N-(6-aminohexyl)aminomethyltrimethoxysilane, N-(6-aminohexyl)aminopropyltrimethoxysilane, N-(2-aminoethyl)-11-aminoundecyltrimethoxysilane, 3-(m-aminophenoxy)propyltrimethoxysilane, m-aminophenyltrimethoxysilane, p-aminophenyltrimethoxysilane, N-3-[amino(poly-propyleneoxy)]aminopropyltrimethoxysilane, 3-aminopropyldiisopropylethoxysilane, 3-aminopropyldimethylethoxysilane, 3-aminopropylmethyldiethoxysilane, 3-aminopropyltriethoxysilane, 3-aminopropyltrimethoxysilane, 11-aminoundecyltriethoxysilane, bis(2-hydroxyethyl)-3-aminopropyltriethoxysilane, bis(methyldiethoxysilyl-propyl)amine, bis(triethoxysilylpropyl)amine, bis(trimethoxysilylpropyl)amine, bis[(3-trimethoxysilyl) propyl]ethylenediamine, bis(3-trimethoxysilylpropyl)-N-methylamine, n-butylaminopropyltrimethoxysilane, t-butylaminopropyltrimethoxysilane, N-cyclohexylaminopropyltrimethoxysilane, 3-(2,4-dinitrophenylamino) propyltriethoxysilane, N-ethylaminoisobutylmethyldiethoxysilane, N-ethylaminoisobutyltrimethoxysilane, N-(3-methacryloxy-2-hydroxypropyl)-3-aminopropyltriethoxysilane, N-methylaminopropylmethyldimethoxysilane, N-methylaminopropyltrimethoxysilane, N-phenylaminomethyltriethoxysilane, N-phenylaminomethyltrimethoxysilane, 3-(N-styrylmethyl)-2-aminoethylamino)propyltrimethoxysilane, (3-trimethoxysilylpropyl)diethylenetriamine, (3-triethoxysilylpropyl)diethylenetriamine, N-cyclohexylaminomethylmethyldiethoxysilane, N-cyclohexylaminomethyltriethoxysilane, N-phenylaminomethyltriethoxysilane or mixtures thereof. The terminal alkoxy groups can be hydrolysed in water or aqueous media to give hydroxy functionalities.

Alkoxysilane-containing adducts are suitable in particular for hydroxyl-containing surfaces such as quartz or glass fibres, with which they react to form a particularly strong bond and are therefore also able to bring about improvements in adhesion and mechanical properties, especially in combination with co-crosslinkable radicals Y with, for example, acrylic groups.

Component (c2)

Blocking agents are used for reversible reaction with isocyanate groups. From these, the blocking agents can be eliminated again—thermally for example—after the reaction, meaning that the isocyanate groups are available again for reaction. In the present field of art, the term "blocked isocyanate" is a term which is familiar to the person of ordinary skill in the art. The blocking agents serve for the preparation of blocked isocyanates.

Suitable blocking agents are known from the prior art and include, for example, lactams, oximes, malonic esters, alkyl acetoacetates, phenols, and also amines, such as butanone oxime, acetone oxime, diisopropylamine, 1,2,4-triazole, imidazole, dimethylpyrazole, diethyl malonate, ethyl acetoacetate, epsilon-caprolactam, for example, or any desired mixtures of these blocking agents. Excluded from consideration as blocking agents, among the aforementioned classes of compound are those representatives of the classes of compound that, besides the group that reversibly blocks isocyanate groups, carry one or more groups which react irreversibly with isocyanate groups. For instance, excluded in particular are those representatives of the classes of compound that fall within the definition of the formula (I). These representatives of the corresponding classes of compound are assigned exclusively to component (b).

Preference is given to using butanone oxime, imidazole, dimethylpyrazole, and epsilon-caprolactam or mixtures of these compounds. Particular preferred are imidazole and 3,5-dimethylpyrazole.

The blocked polyisocyanate groups are prepared, for example, by reaction in accordance with methods known from the prior art. These methods are described, for example, in Liebigs Annalen from 1949, Volume 562, pages 205 to 229.

The blocked polyisocyanate adducts can be prepared by direct reaction of the isocyanate groups with the blocking agent, or in the case of C—H— acidic blocking agents such as malonic esters, with addition of deprotonating agents.

Component (c3)

Component (c3) is optional and represented by the general formula (III) as Z-Q. The group Z is an organic basic radical having at least one tertiary amino group that contains no NCO-reactive groups. The radical Z is preferably an aliphatic or cycloaliphatic group having at least one tertiary amino group, where appropriate in the form of a tertiary ring nitrogen atom of a heterocyclic ring system. The tertiary amino group, or the heterocyclic ring system with tertiary ring nitrogen, may be attached to the group Q directly or via an organic bridging group ("spacer"). The spacer via which the tertiary amino group or the heterocyclic ring system of tertiary ring nitrogen may be attached to the group Q comprises preferably 2 to 10, more preferably 2 to 5, carbon atoms. With particular preference it is an alkylene group having 2 to 10, very preferably 2 to 5, carbon atoms, or a polyether group having the same number of carbon atoms. The group Q is defined as for component (c1).

One group of compounds which can be used as compounds Z-Q of the formula (III) is composed of monohydroxy amines having a tertiary amino group, or aliphatic diamines having a tertiary amino group and a primary or secondary amino group, such as, for example, (N,N-diethylamino)ethanol, (N,N-dimethylamino)ethanol, (N,N-dimethylamino)propanol, 2-(diethylamino)ethylamine, 3-(dimethylamino)propylamine, 3-(diethylamino)propylamine, N,N-diethyl-1,4-butanediamine, 1-diethylamino-4-aminopentane, of which 3-(dimethylamino)propylamine and (N,N-diethylamino)ethanol are preferred.

In the case of a further group Z is a monocyclic or bicyclic heterocyclic group, of which a ring nitrogen atom is attached to the group Q preferably via an alkylene group having 2 to 5 carbon atoms. Preferred heterocycles are triazole, pyrimidine, imidazole, pyridine, morpholine, pyrrolidine, piperidine, benzimidazole, benzothiazole and/or triazine and more preferably imidazole and benzimidazole. These heterocycles may contain one or more substituents. They preferably carry one of the following groups: alkyl and/or alkoxy groups having 1 to 6, preferably 1 to 4 carbon atoms (in which case a methoxy group is preferred), or tertiary amino groups.

It is preferred that the heterocyclic groups are attached via a ring nitrogen atom and an alkylene group, preferably with 2 to 5 carbon atoms, to the group Q. The heterocyclic group may of course, besides this ring nitrogen atom, also contain further heteroatoms, including further ring nitrogen atoms.

Further examples of the compounds of the formula (III) are N-(3-aminopropyl)imidazole, N-(3-aminopropyl) morpholine, N-(2-aminoethyl)piperidine, 1-methyl-piperazine, aminoethylpiperazine. It is characteristic of these compounds that they contain per molecule at least 1 reactive group with at least 1 Zerewitinoff hydrogen atom which is able to react with the NCO groups, and that they additionally possess a nitrogen-containing basic group without reactive hydrogen. These basic groups are characterized in the prior art by their pKa value (cf. U.S. Pat. Nos. 3,817,944; 4,032,698 and 4,070,388). Preference is given to compounds with basic groups having a pKa value of 2 to 14, more preferably of 5 to 14 and very preferably of 5 to 12. The pKa value can be taken from tabular works. The limiting values indicated above refer to the measurement of the pKa value at 25° C. in a 0.01 molar concentration in water. These basic groups likewise endow the addition compounds of the invention with basicity.

Compounds of the formula Z-Q can be obtained, for example, by reacting a (meth)acrylate or epoxide with an amine or nitrogen-containing heterocyclic ring system. Examples of reaction products between a (meth)acrylate and a nitrogen-containing heterocyclic ring system are the reaction products of the hydroxyethyl esters and hydroxypropyl esters of (meth)acrylic acid with the nitrogen-containing heterocyclic ring structure, the following structural elements being attached to the nitrogen of the heterocyclic ring structure:
-propionic acid 2-hydroxyethyl ester, -propionic acid 2-hydroxypropyl ester, -2-methylpropionic acid 2-hydroxyethyl ester and -2-methylpropionic acid 2-hydroxypropyl ester, and ethoxylated and/or propoxylated derivatives thereof. The acrylic esters are preferred.

The reaction with amines proceeds analogously.

Through reaction of an epoxide with an amine or with a nitrogen-containing heterocyclic compound it is likewise possible to prepare the compounds Z-Q. In the course of the reaction, the group Q formed is a secondary hydroxyl group, and a tertiary amino group is formed on the nitrogen atom that takes part in the reaction.

For preparing the addition compounds of the invention, it is also possible to use mixtures of different starting materials such as mixtures of polyisocyanates and/or components (b) and/or components (c). Individual representatives of the two or more components (a), (b1), (b2) or (c) may be used in a superstoichiometric or substoichiometric amount. The proportions, however, are preferably chosen such that the isocyanate groups undergo substantially complete reaction. This means that preferably at least 90%, more preferably at least 95%, very preferably at least 98%, and ideally all of the isocyanate groups have undergone reaction.

By virtue of the basic groups the addition compounds are capable of forming salts. For the purposes of the invention, as dispersants, they can also be used in the form of the corresponding salts. In certain cases, by means of such partial or complete salination it is possible to obtain an improvement in activity and/or an enhanced solubility or compatibility. Even in applications where the basicity of the products is a disrupting factor, as for example, in acid-catalyzed systems, it is frequently possible to achieve improvements by means of partial or complete neutralization.

The salts are obtained from the resultant reaction product by neutralization with one or more organic or inorganic acids or by quaternization. The amount of acid to be used is guided by the field of use. Depending on each individual case, the acid components may be used in equimolar, substoichiometric or superstoichiometric amounts. From polycarboxylic acids, for example, it is also possible to use up to one equivalent of polycarboxylic acid per basic group to be neutralized in order to give the products an acidic character. It is preferred to carry out approximately equimolar neutralization. Preference is given to salts with organic carboxylic acids or acid phosphoric esters. Examples of such acidic phosphoric esters are given in EP 893 155, EP 417 490 and U.S. Pat. No. 5,143,952. Examples of carboxylic acids are aliphatic and/or aromatic carboxylic acids such as short-chain or long-chain fatty acids, formic acid, acetic acid, neodecanoic acid, oleic acid, tall oil fatty acid, stearic acid, ricinoleic acid, natural saturated or unsaturated plant or animal fatty acids and their maleic anhydride adducts, maleic acid, fumaric acid, succinic acid, dodecenylsuccinic acid, 5-norbornene-2,3-dicarboxylic acid, adipic acid, glutaric acid, benzoic acid, nitrobenzoic acid, phthalic acid, tetrahydrophthalic acid, isophthalic acid, terephthalic acid, dimerized or trimerized fatty acids, citric acid and abietic acid.

Where the addition compounds of the invention contain hydroxyl groups, the latter may, if desired, be subjected to ester-forming reaction, wholly or partly, with polycarboxylic acids having at least two carboxyl groups or their anhydrides, in an amount such that at least 0.8 molecule of the polycarboxylic acid or of the polycarboxylic anhydride is used for each hydroxyl group to be reacted. The addition compounds thus reacted therefore contain one or more carboxyl groups per reacted OH group, these carboxyl groups being capable of salt formation with the amino groups. Examples of such polycarboxylic acids are maleic acid, fumaric acid, succinic acid, dodecenylsuccinic acid, 5-norbornene-2,3-dicarboxylic acid, adipic acid, glutaric acid, phthalic acid, tetrahydrophthalic acid, isophthalic acid, terephthalic acid, dimerized or trimerized fatty acids and citric acid. Preference is given to using anhydrides of 1,2-dicarboxylic acids, such as maleic anhydride, succinic anhydride, dodecenylsuccinic anhydride, phthalic anhydride and tetrahydrophthalic anhydride.

The addition compounds of the invention preferably contain no ethylenically unsaturated groups.

When the polyisocyanates who use is preferred are employed that have on average at least 2.5 free isocyanate groups, branched, i.e. non-linear, polyurethane structures are formed. Accordingly, non-linear addition compounds are particularly preferred in accordance with the invention.

The preparation of the addition compounds of the invention can be carried out, according to viscosity, in bulk or in the presence of suitable solvents, solvent mixtures or other suitable carrier media. Suitable solvents or carrier media are all those which are not reactive under the chosen reaction conditions or whose reactivity towards the coreactants is negligible and in which the reactants and the reaction products are at least partly soluble. Examples are hydrocarbons such as toluene, xylene, aliphatic and/or cycloaliphatic benzine fractions, chlorinated hydrocarbons such as chloroform, trichloroethane, cyclic and acyclic ethers such as dioxane, tetrahydrofuran, polyalkylene glycol dialkyl ethers such as dipropylene glycol dimethyl ether, esters of monocarboxylic, dicarboxylic or polycarboxylic acids, such as ethyl acetate, butyl acetate, butyrolactone, dimethyl 2-methylglutarate, triacetin, phthalates or other plasticizers, di- or polycarboxylic esters, dialkyl esters of $C_2$ to $C_4$ dicarboxylic acids, referred to as "Dibasic Ester", alkyl glycol esters such as ethyl glycol acetate, methoxypropyl acetate, ketones such as methyl isobutyl ketone, cyclohexanone, acetone, acid amides such as dimethylformamide, N-methylpyrrolidone, and the like. The solvent or solvents and/or carrier media are advantageously selected to take account of the planned field of use. For example, for addition compounds of the invention for use in water-thinnable coating systems, or for coating pigments in aqueous suspension following the pigment synthesis, it is preferred to use solvents which are totally or partly water-dilutable. Where the products are to be used, for example, in applications where the presence of VOCs (volatile organic compounds) is unwanted, the formulation should as far as possible be solvent-free or in appropriately high-boiling carrier media.

Depending on the field of application it is possible for the solvents used for the synthesis to remain in the reaction mixture, or they are fully or partly removed and, where appropriate, replaced by other solvents or carrier media. Depending on compatibility the addition compounds of the invention can also be combined with resins, resin solutions, reactive diluents, binders or other prior art additives, such as other wetting agents and dispersants, anti-settling agents, surface-active additives such as silicones, for example, and the like.

The solvent can be removed, for example, by distillation, where appropriate under reduced pressure, and/or azeotropically with the addition of water, such removal being complete or partial. Alternatively the active substance can be isolated by precipitation, by the addition of non-solvents such as aliphatic hydrocarbons, hexane for example, subsequent separation by filtration, and drying if desired. The active substance obtained by one of these methods can then be diluted in a solvent suitable for the particular field of application, or where appropriate can be used as it is, in the case of powder coating materials for example. If desired, following the addition of suitable high-boiling solvents, the solvent in which the addition product is dissolved can be distilled off, where appropriate under reduced pressure, and/or azeotropically with addition of water. In this way the addition product can be transferred to a carrier medium that is suitable for the respective field of application. For applications where the use of solids is preferred, such as powder coating materials or certain plastics processing methods, the addition compounds may also be converted into a solid form by means of other processes known according to the prior art for polymers. Examples of such processes are microencapsulation, spray drying, adsorption onto a solid carrier such as $SiO_2$ for example, or the PGSS process (particles from gas saturated solutions).

The reactions can be carried out in the presence of customary catalysts, examples being organotin compounds, such as dibutyltin dilaurate, other organometallic compounds such as iron acetylacetonate, tertiary amines such as triethylenediamine, enzymes or the like.

By varying the substituents of the formula (I) in terms of the nature, proportions and/or molecular weights thereof, it is possible to adapt the properties of the addition compounds of the invention to the different fields of application. For example, the solubility and compatibility can be brought into line with a very wide variety of solvents, carrier media, binders, resins, solids and, where appropriate, further polymeric compounds that are present in coating and moulding materials in which the addition compounds according to the invention are employed.

For use in highly polar systems such as water-based coating materials, for example, the radicals Y ought to include a sufficiently high fraction of polar groups, such as polyethylene oxides, for example, in order to achieve a level of water solubility which is sufficient for the particular area of use. This fraction of hydrophilic groups ought also not to be too high, however, if in certain applications this results in an unwanted increase in the sensitivity to water.

In the case of use in apolar systems such as long-oil alkyd paints, PVC plastisols or polyolefins there should preferably be an appropriate fraction of apolar groups, and in the case of use in systems where broad compatibility is important, such as pigment concentrates, for example, a balanced combination of polar and apolar groups is of advantage.

For dispersing in silicone oils such as decamethylcyclopentasiloxane, for example, for cosmetic preparations for example, polydimethylsiloxane-containing addition compounds in particular are suitable. If the addition compounds are used, for example, in a polyurethane resin or in a coating material whose binder is a polyurethane it is advantageous to use those addition compounds of the invention whose molecule, by virtue of the groups present in the starting compounds of the formula (I), also includes urethane groups or similar groups which, as is known to the skilled person, are compatible with polyurethanes. The same applies, mutatis mutandis, to, for example, polyacrylates, polyesters, alkyd resins, and other polymers.

Mutatis mutandis this also applies to the substituents of component (c), which exert particular influence over the affinity of the addition compounds of the invention for the solids used that are to be dispersed.

Addition compounds of the invention with surface-active substituents may modify the surface tension of the substrates produced using them. If, for instance, very apolar groups such as long-chain alkyl groups having more than 12 carbon atoms, polydimethylsiloxane-containing and/or perfluoroalkyl-containing groups are present, for example, the products are suitable for reducing the surface tension of liquid organic or aqueous systems or of solid systems, and for influencing the associated properties such as, for example, wetting properties, stainability, printability, flow and foam behaviour. In systems which exhibit reactivity with OH groups, COOH groups and/or double bonds, examples being 2-component systems based on isocyanate or on melamine resin, epoxide-containing systems, radiation-curing coatings, such as UV-curing or electron-beam-curing paints and printing inks, or unsaturated polyester systems, for example, co-crosslinking can be achieved through the use of addition compounds of the invention containing reactive groups such as OH groups, COOH groups and/or unsaturated groups, and leads to improvements in adhesion, incorporation of solids, mechanical properties and migration behaviour. In applications where the presence of double bonds leads to unwanted disadvantages such as discoloration, as a result for example of high processing temperatures, it is advantageous to use addition compounds of the invention with as few unsaturated groups as possible and preferably none at all.

The number-average molecular weight $M_n$ of the addition compounds of the invention is preferably at least 500 g/mol, more preferably at least 800 g/mol, very preferably at least 1200 g/mol and ideally at least 2000 g/mol.

The invention also provides a process for preparing the addition compounds of the invention, which comprises reacting (a) one or more polyisocyanates having at least two isocyanate groups per molecule with
(b) one or more compounds of the formula (I)

$$Y-(XH)_n \quad (I)$$

where
XH is a group that is reactive towards isocyanates and
Y is a monomeric or polymeric group that is not reactive towards isocyanates, that contains no tertiary amino groups and no hydrolysable silane groups and that comprises one or more aliphatic, cycloaliphatic and/ or aromatic groups,
and where
n is 1, 2 or 3,
the compound of the formula (I) possessing a number-average molar mass $M_n$ of less than 20 000 g/mol and not representing a compound which falls within the definition of component (c2),
and
where for at least 50 mol % of the compounds of the formula (I) it is the case that n is 1,
with the proviso that 20% to 90% of the isocyanate groups of component (a) are reacted with the compounds of the formula (I),
and
(c) one or more compounds from the group consisting of
(c1) compounds of the formula (II)

$$M-Q \quad (II)$$

in which
M is an organic radical having a number-average molar mass of not more than 1000 g/mol which contains
i) at least one tertiary amino group and at least one hydroxyl group
or
ii) at least one hydrolysable silane group with the proviso that for 100% of the compound of the general formula (I) n is 1, and
Q is $NH_2$, OH or NHR, in which R is a linear or branched alkyl group having 1 to 18 carbon atoms,
(c2) a blocking agent for isocyanate groups, and
(c3) optionally compounds of the general formula (III)

$$Z-Q \quad (III)$$

in which
Z is an organic basic radical having at least one tertiary amino group and contains no NCO-reactive groups, and
Q is $NH_2$, OH or NHR, in which R is a linear or branched alkyl group having 1 to 18 carbon atoms,
where, if desired, any hydroxyl groups present in the reaction product of (a), (b) and (c) are reacted with polycarboxylic acids having at least two carboxyl groups or their anhydrides in an amount such that at least 0.8 molecule of the polycarboxylic acid or of the polycarboxylic anhydride is used for each hydroxyl group to be reacted;
subject to the proviso that at least 10% of the isocyanate groups of component (a) are reacted with component (c) and use is made as component (c) of at least 5 mol % of one or more of components (c1) and/or (c2), and that 0% to 50% of the isocyanate groups of component (a) are reacted with one or more components (c3).

The components (a), (b) and (c) that are used in the process of the invention correspond to those already described earlier on above.

The process of the invention is preferably carried out such that first of all the compounds of component (a) are reacted with those of component (b) and only then are the remaining isocyanate groups reacted with the compounds of component (c).

It is further advantageous, when using compounds of the formula (I) with n=1 and n=2 or 3, first to react the polyisocyanates of component (a) with the compounds of the formula (I) for which n is 1, and only then to carry out a reaction with those compounds of the formula (I) for which n=2 or 3.

The invention further provides for the use of the above-described addition compounds of the invention as wetting agents and dispersants and as dispersion stabilizers.

The invention further provides powder-type or fibrous solids intended for incorporation into liquid systems and coated with these addition compounds as dispersants and as dispersion stabilizers or as wetting agents.

The addition compounds of the invention can be used in dispersants, dispersion stabilizers or wetting agents place of their prior art counterpart. Thus, for example, they can be used in the preparation or processing of paints, printing inks, other inks, for example inkjet inks, paper coatings, leather and textile colours, pastes, pigment concentrates, ceramics, and cosmetic preparations, particularly if they contain solids such as pigments and/or fillers. They can also be employed in connection with the preparation or processing of moulding compositions based on synthetic, semi-synthetic or natural macromolecular substances, such as polyvinyl chloride, saturated or unsaturated polyester, polyurethane, polystyrene, polyacrylate, polyamide, epoxy resins, polyolefins such as polyethylene or polypropylene, for example. By way of example it is possible to use the addition compounds for preparing casting compositions, PVC plastisols, gelcoats, polymer concrete, printed circuit boards, industrial paints, wood and furniture varnishes, vehicle finishes, marine paints, anti-corrosion paints, can coatings and coil coatings, decorating paints and architectural paints, where binders and/or solvents, pigments and optionally fillers, the addition compound, and typical auxiliaries are mixed.

The addition compounds are used preferably for producing pigment- and/or filler-comprising pigment concentrates, paints, pastes and/or moulding compositions.

Examples of typical binders are resins based on polyurethane, cellulose nitrate, cellulose acetobutyrate, alkyd, melamine, polyester, chlorinated rubber, epoxide and acrylate. Examples of water-based coatings are cathodic or anodic electrodeposition coatings for car bodies, for example. Further examples are renders, silicate paints, emulsion paints, aqueous paints based on water-thinnable alkyds, alkyd emulsions, hybrid systems, 2-component systems, polyurethane dispersions and acrylate dispersions.

The addition compounds of the invention are particularly suitable as well for preparing concentrates of solids, such as pigment concentrates, for example. For that purpose the compounds of the invention are initially introduced in a carrier medium such as organic solvents, plasticizers and/or water, and the solids to be dispersed are added with stirring. Additionally these concentrates may include binders and/or other auxiliaries. With the addition compounds of the invention, however, it is possible in particular to prepare stable binder-free pigment concentrates. It is also possible using the compounds of the invention to prepare fluid concentrates of solids from pigment presscakes. In this case the compound of the invention is admixed to the presscake, which may additionally contain organic solvents, plasticizers and/or water, and the resulting mixture is dispersed. Prepared in their different ways, the concentrates of solids can then be incorporated into different substrates such as, for example, alkyd resins, polyester resins, acrylate resins, polyurethane resins or epoxy resins. Pigments can also, however, be dispersed directly in the addition compounds of the invention, without solvent, and are then particularly suitable for pigmenting thermoplastic and thermoset polymer formulations. The addition compounds of the invention can be also be used with advantage in connection with the production of colour filters for liquid-crystal displays, liquid-crystal screens, colour resolution devices, sensors, plasma screens, displays based on SED (Surface conduction Electron emitter Display) and for MLCC (Multi-Layer Ceramic Compounds). The MLCC technology is used in connection with the production of microchips and printed circuit boards.

The addition compounds of the invention can also be used to produce cosmetic preparations such as, for example, makeup, powder, lipsticks, hair colorants, creams, nail varnishes and sun protection products. These may be present in the customary forms, as for example W/O or O/W emulsions, solutions, gels, creams, lotions or sprays. The addition compounds of the invention can be used with advantage in dispersions that are used for preparing these preparations. These dispersions may contain the carrier media that are typical for these purposes in cosmetology, such as, for example, water, castor oils or silicone oils, and solids, such as organic and inorganic pigments such as titanium dioxide or iron oxide, for example.

The invention also provides, furthermore, for the use of an addition compound of the invention for preparing a pigmented paint which serves in particular for producing a pigmented coating on a substrate, the pigmented paint being applied to the substrate and the pigmented paint which has been applied to the substrate being baked or cured and/or crosslinked.

The dispersants can be used alone or together with customary prior art binders. For use in polyolefins, for example, it can be advantageous to use corresponding polyolefins of low molecular mass as carrier materials, together with the dispersant.

One inventive use of the addition compounds is in the preparation of dispersible solids in powder particle and/or fibre particle form, particularly of dispersible pigments or plastics fillers, the particles being coated with the inventive addition compound. Coatings of this kind of organic and inorganic solids are performed in a known way, as described in EP-A-0 270 126, for example. In this case the solvent or emulsion medium can either be removed or remain in the mixture, with the formation of pastes. These pastes are customary commercial products and may additionally include binder fractions and also further auxiliaries and additives. Specifically in the case of the pigments it is possible for the pigment surface to be coated during or after the synthesis of the pigments, by the addition, for example, of the addition products of the invention to the pigment suspension or during or after the pigment finish. The pigments pretreated in this way are distinguished by greater ease of incorporation and also by improved viscosity, flocculation and gloss behaviour and by higher colour strength as compared with untreated pigments.

Besides the above-described application, as dispersants and/or coating materials for powder-type and fibrous solids, the addition compounds of the invention can also be used as viscosity reducers and compatibilizers in synthetic resins. Examples of such synthetic resins are those known as sheet moulding compounds (SMC) and bulk moulding compounds (BMC), which are composed of unsaturated polyester resins with high filler and fibre contents. Their preparation and processing are described by way of example in DE-A-36 43007. One problem affecting SMC and BMC synthetic resin mixtures is that often polystyrene (PS) is added to the formulation in order to reduce contraction during the processing operation. PS is not compatible with the unsaturated polyester resins used, and separation of the components occurs. When PS-filled SMC or BMC mixtures are being used, the additives of the invention, by virtue of their good dispersing qualities, are able to bring about compatibilization between PS and unsaturated polyester resin, thereby increasing the storage stability and processing reliability of such mixtures.

In many cases, including for example incompatible polyol mixtures, polyolisocyanate mixtures or polyol/blowing agent mixtures used for polyurethane production, through the addition compounds of the invention it is possible wholly or partly to prevent the separation problems which result from this incompatibility and affect dispersions, especially emulsions.

The addition compounds of the invention are added preferably in an amount of 0.01% to 10% by weight, based on the total formulation amount. Based on the solid to be dispersed, they are used in an amount of preferably 0.5% to 100% by weight. Where difficult-to-disperse solids are used, the amount of inventive addition compound employed may well be higher. The amount of dispersant is generally dependent on the surface that is to be coated of the substance that is to be dispersed. For example, if titanium dioxide is used as a pigment, the amount of dispersant is lower than in the case of, say, carbon black. Generally speaking, the amount of dispersant needed to disperse inorganic pigments is less than for organic pigments, since the latter have a higher specific surface area and, consequently, a greater amount of dispersant is needed. Typical addition levels for inorganic pigments are 1-10% by weight, for organic pigments 10-30% by weight (in each case expressed as active substance of addition compound relative to pigment). In the case of very finely divided pigments, with sub-100 nm particle size (e.g. some carbon blacks), amounts of 30-80% by weight or more need to be added, even.

As a criterion of sufficient pigment stabilization it is possible for example to employ colour strength, gloss and transparency of the pigment dispersion or the degree of floating (rub-out test) in the case of a white reduction.

The dispersing of the solids may take place as a single dispersion or else as a mixed dispersion with two or more pigments simultaneously, the best results generally being achievable with single dispersions. When mixtures of different solids are used, opposing charges on the surfaces of the solids may result in an increased incidence of agglomeration in the liquid phase. In these cases it is frequently possible, using the addition compounds of the invention, to achieve a charge of equal sign, generally a positive charge, for all of the particles and hence to avoid instabilities due to charge differences. The dispersants achieve their optimum effect when added to the millbase, particularly if first of all the solid to be dispersed is mixed only with the additive and, where appropriate, solvents ("premix"), since in that case the additive is able to adsorb preferentially onto the surface of the solid, without having to compete with the binder polymers. In practice, however, this procedure is necessary only in exceptional cases. If necessary, the addition compounds can also be employed subsequently (as what are called "post-additives"), in order, for example, to solve floating or flocculation problems in a batch which has already been let down. Generally speaking, however, increased levels of addition of additive are necessary in this case.

In certain cases the addition compounds of the invention may exert a more or less pronounced influence on the rheology of the system. In such cases, therefore, they can also be used for rheology control, where appropriate in combination with other rheological additives such as fumed silica, phyllosilicates (bentonites), hydrogenated castor oils, or the additives BYK®-410, BYK®-420 and BYK®-425 (BYK Chemie GmbH). In these cases, synergistic effects are frequently observed. In many cases it is also possible to improve the corrosion control properties of coatings through the use of the addition compounds of the invention.

Examples of powder-type or fibrous solids are those which may be coated with dispersants, especially organic and inorganic pigments which are used in paints, coating materials, moulding compositions or other plastics, and organic or inorganic fillers which are used to fill or reinforce paints, coating materials, moulding compositions or other plastics. A subgroup of such fillers are fibres of organic and/or inorganic type which are likewise used as fillers or reinforcing substances.

Examples of pigments are mono-, di-, tri- and poly-azo pigments, oxazine, dioxazine and thiazine pigments, diketopyrrolopyrroles, phthalocyanines, ultramarine and other metal complex pigments, indigoid pigments, diphenylmethane, triarylmethane, xanthene, acridine, quinacridone and methine pigments, anthraquinone, pyranthrone, perylene and other polycyclic carbonyl pigments, inorganic pigments based on carbon black, graphite, zinc, titanium dioxide, zinc oxide, zinc sulphide, zinc phosphate, barium sulphate, lithopones, iron oxide, ultramarine, manganese phosphate, cobalt aluminate, cobalt stannate, cobalt zincate, antimony oxide, antimony sulphide, chromium oxide, zinc chromate, mixed metal oxides based on nickel, bismuth, vanadium, molybdenum, cadmium, titanium, zinc, manganese, cobalt, iron, chromium, antimony, magnesium, aluminium (for example nickel titanium yellow, bismuth vandate molybdate yellow or chromium titanium yellow), magnetic pigments based on pure iron, iron oxides and chromium oxides or mixed oxides, metallic pigments comprising aluminium, zinc, copper or brass, and also pearlescent pigments, and fluorescent and phosphorescent luminescent pigments. All of the afore-mentioned pigments may be in surface-modified form and may possess basic, acidic or neutral groups on the surface. Preference is given to neutral or acidically modified pigments, such as oxidized carbon blacks, for example.

Further examples are nanoscale organic or inorganic solids having particle sizes below 100 nm, such as certain grades of carbon black, or particles composed of a metal or semimetal oxide or hydroxide, and also particles composed of mixed metal and/or semimetal oxides and/or hydroxides. By way of example it is possible to employ the oxides and/or oxide hydroxides of aluminium, silicon, zinc, titanium, etc. in order to prepare extremely finely divided solids of this kind. These oxidic, hydroxidic or oxide-hydroxidic particles may be prepared by any of a wide variety of methods such as, for example, ion-exchange operations, plasma operations, sol-gel processes, precipitation, comminution (by grinding, for example) or flame hydrolysis, and the like.

Examples of powder-type or fibrous fillers are, for example, those composed of powder-type or fibrous particles of aluminium oxide, aluminium hydroxide, silicon dioxide, kieselguhr, siliceous earth, quartz, silica gel, talc, kaolin, mica, perlite, feldspar, slate flour, calcium sulphate, barium sulphate, calcium carbonate, calcite, dolomite, glass or carbon. Further examples of pigments or fillers are found for example in EP-A-0 270 126. Additionally flame retardants such as, for example, aluminium hydroxide or magnesium hydroxide, and matting agents such as silicas, for example, can likewise be dispersed and stabilized outstandingly.

In the text below, the present invention is further illustrated by examples which follow.

EXAMPLES

In the case of substances without molecular uniformity the stated molecular weights represent average values of the numerical mean. The molecular weights or number-average molecular weights $M_n$, are determined, when titratable hydroxyl or amino groups are present, by end-group determination via the determination of the OH number or amine number, respectively. In the case of compounds to which an end-group determination cannot be applied, the number-average molecular weight is determined by means of gel permeation chromatography against a polystyrene standard.

Unless otherwise remarked, parts are parts by weight and percentages are percentages by weight.

The free NCO content of the polyisocyanates employed and also the course of the NCO addition reactions, are determined in accordance with EN ISO 9369 by reaction with butylamine and subsequent titration of the amine excess. These methods are also described in Saul Patai's "The Chemistry of Cyanates and their Thio Derivatives", Part 1, Chapter 5, 1977.

The hydroxy-functional caprolactone polyesters are prepared as described in EP 158678, for example.

Preparation Examples

Intermediates

Component (B)

Intermediate A1

Polyester of isodecanol and epsilon-caprolactone (molar ratio 1:8.3)

Under an inert atmosphere, 144 parts of isodecanol and 857 parts of epsilon-caprolactone are homogenized, 0.04 part of dibutyltin dilaurate (DBTL) is added and the mixture heated to 180° C. It is stirred at this temperature for about 4 hours until a SC (solids content) of 98% is reached. The product with a number-average molar mass $M_n$ of about 1100 g/mol is solid at room temperature and has an OH number of 51 mg KOH/g.

Intermediate A2

Polyester of n-decanol and epsilon-caprolactone (molar ratio 1:8.3)

Under an inert atmosphere, 144 parts of n-decanol and 857 parts of epsilon-caprolactone are homogenized, 0.02 part of DBTL is added and the mixture heated to 170° C. It is stirred at this temperature for about 6 hours until an SC of 99% is reached. The product with a number-average molar mass $M_n$ of about 1100 g/mol is solid at room temperature and has an OH number of 51 mg KOH/g.

Intermediate A3

Polyester of methoxypolyethylene glycol having an average molar mass of 500 and epsilon-caprolactone (molar ratio 1:3)

Under an inert atmosphere, 58 parts of methoxy-polyethylene glycol and 42 parts of epsilon-caprolactone are homogenized, 0.3 part of dodecylbenzenesulphonic acid is added and the mixture heated to 80° C. It is stirred at this temperature for about 2 hours until a solids content of 97% is reached. The product with a number-average molar mass $M_n$ of about 900 g/mol is liquid at room temperature and has an OH number of 63 mg KOH/g.

Intermediate A4

Polyester of 3-aminopropyltriethoxysilane and epsilon-caprolactone (molar ratio 1:7.7)

Under an inert atmosphere, 200 parts of 3-aminopropyltriethoxysilane and 793 parts of epsilon-caprolactone are homogenized, 0.02 part of DBTL is added and the mixture heated to 160° C. It is stirred at this temperature for about 10 hours until an SC of 95% is reached. The product with a number-average molar mass $M_n$ of about 1100 g/mol is wax-like at room temperature and yellowish and has an OH number of 51 mg KOH/g.

Intermediate A5

Polyester of monophenyl glycol and epsilon-caprolactone (molar ratio 1:5.7)

Under an inert atmosphere, 178 parts of monophenyl glycol and 822 parts of epsilon-caprolactone are homogenized, 0.04 part of DBTL is added and the mixture heated to 160° C. It is stirred at this temperature for about 7 hours until an SC of 98% is reached. The product with a number-average molar mass $M_n$ of about 800 g/mol is solid at room temperature and has an OH number of 70 mg KOH/g.

Intermediate A6

Polyester of oleyl alcohol, epsilon-caprolactone and delta-valerolactone (molar ratio 1:1.08:1.08)

Under an inert atmosphere, 530 parts of oleyl alcohol, 248 parts of epsilon-caprolactone and 218 parts of delta-valerolactone are homogenized. The mixture is heated slowly to 160° C. and then 0.02 part of DBTL is added. The mixture is stirred for about 7 hours at this temperature, admixed again with DBTL (0.01 part) and stirred for 5 hours more until an SC of 96% is reached. The product with a number-average molar mass $M_n$ of about 500 g/mol is liquid at room temperature and has an OH number of 115 mg KOH/g.

Intermediate A7

Polyester of butoxypolypropylene glycol (having an average molar mass of about 700), epsilon-caprolactone and delta-valerolactone (molar ratio 1:10.5:10.5)

Under an inert atmosphere, 250 parts of butoxypolypropylene glycol, 428 parts of epsilon-caprolactone and 375 parts of delta-valerolactone are homogenized, 0.04 part of DBTL is added and the mixture heated to 160° C. It is stirred at this temperature for about 11 hours until an SC of 98% is reached. The product with a number-average molar mass $M_n$ of about 3000 g/mol is solid at room temperature and has an OH number of 19 mg KOH/g.

End Products

Example 1

28.1 parts of polyisocyanate P1 are homogenized with 35.3 parts of intermediate A1 and 34 parts of PMA (methoxypropyl acetate). The mixture is heated to 80° C. under inert gas and 0.003 part of DBTL (dibutyltin dilaurate) is added. It is stirred at this temperature for about 1 hour until 60% of the NCO groups used have reacted. Then 2.4 parts of caprolactam are added and stirring is continued at 80° C. until all of the NCO groups have been consumed by reaction. The product is of medium viscosity and has a solids content of 52%.

Example 2

In analogy to Example 1, 1.45 parts of imidazole are used instead of caprolactam. The solids content is 52%. The amine number is 12 mg KOH/g.

Example 3

In analogy to Example 1, 1.9 parts of 2-butanone oxime are used instead of caprolactam. The solids content is 52%.

Example 4

In analogy to Example 1, 2.1 parts of 3,5-dimethylpyrazole are used instead of caprolactam. The solids content is 52%.

Example 5

In analogy to Example 1, 1.03 parts of 3,5-dimethylpyrazole are used instead of caprolactam. After the pyrazole has been consumed by reaction, 1.36 parts of API (aminopropylimidazole) are added. The solids content is 52%. The amine number is 6 mg KOH/g.

Example 6

In analogy to Example 1, 0.93 part of 2-butanone oxime is used instead of caprolactam. After the oxime has been consumed by reaction, 1.36 parts of API are added. The solids content is 52%. The amine number is 6 mg KOH/g.

Example 7

In analogy to Example 1, 0.73 part of imidazole is used instead of caprolactam. After the imidazole has been consumed by reaction, 1.35 parts of API are added. The solids content is 52%. The amine number is 12 mg KOH/g.

Example 8

In analogy to Example 1, 1.2 parts of caprolactam are used instead of 2.4 parts of caprolactam. After the caprolactam has been consumed by reaction, 1.35 parts of API are added. The solids content is 52%. The amine number is 6 mg KOH/g.

Example 9

In analogy to Example 1, 3.2 parts of triethanolamine are used instead of caprolactam. The product is of medium viscosity. The solids content is 52%. The amine number is 10 mg KOH/g and the OH number is 27 mg KOH/g.

Example 10

In analogy to Example 1, 2.5 parts of N-methyldiethanolamine are used instead of caprolactam. The product is of medium viscosity. The solids content is 52%. The amine number is 12 mg KOH/g.

Example 11

In analogy to Example 1, 2.8 parts of aminopropylmethylethanolamine are used instead of caprolactam. The product is of high viscosity. The solids content is 52%. The amine number is 13 mg KOH/g and the OH number is 12 mg KOH/g.

Example 12

In analogy to Example 1, 2.3 parts of tris-2-hydroxyethyl isocyanurate and 1.1 parts of triethanolamine in 11.2 parts of NMP are used instead of caprolactam. The product is of medium viscosity. The solids content is 49%.

Example 13

In analogy to Example 1, 3.1 parts of 3-(diethylamino) propane-1,2-diol are used instead of caprolactam. The product is of high viscosity. The solids content is 52%.

Example 14

In analogy to Example 1, 2.1 parts of triethanolamine are used instead of caprolactam. The product is of high viscosity. The solids content is 52%. The amine number is 7 mg KOH/g.

Example 15

15.7 parts of polyisocyanate P1 are homogenized with 9.9 parts of intermediate A1 and 45.3 parts of PMA. The mixture is heated to 60° C. under inert gas and 0.001 part of DBTL is added. After about an hour, 30% of the NCO groups used have reacted. Then 3.15 parts of a polyethylene glycol ($M_n$=1000 g/mol) are added. Stirring is continued at 60° C. until a further 21% of the NCO groups used have reacted. Then 0.5 part of imidazole and 15 minutes later, 0.93 part of API and also 24.5 parts of N-methylpyrrolidone are added and stirring is continued at 80° C. until the remaining NCO groups have been consumed by reaction. The product possesses an amine number of 8 mg KOH/g and a solids of 22.5%.

Example 16

15.7 parts of polyisocyanate P1 are homogenized with 9.9 parts of intermediate A1 and 45.3 parts of PMA. The mixture is heated to 60° C. under inert gas and 0.001 part of DBTL is added. After about an hour, 30% of the NCO groups used have reacted. Then 3.15 parts of a polyethylene glycol ($M_n$=1000 g/mol) are added. Stirring is continued at 60° C. until a further 21% of the NCO groups have reacted. Then 1.40 parts of 3,5-dimethylpyrazole are added and the mixture is stirred at 90° C. until the remaining NCO groups have been consumed by reaction. The solids content is 30%.

Example 17

21.5 parts of polyisocyanate P1 are homogenized with 14 parts of intermediate A1, 13 parts of intermediate A4 and 26.4 parts of PMA. The mixture is heated to 60° C. under inert gas and 0.001 part of DBTL is added. After 0.75 hour, 60% of the NCO groups used have reacted. Then 1.2 parts of epsilon-caprolactam, 1 part of API and 23.1 parts of PMA are added and the mixture is stirred at 80° C. until the remaining NCO groups have been consumed by reaction. The solids content is 40%.

Example 18

15.7 parts of polyisocyanate P1 are homogenized with 9.9 parts of intermediate A2 and 45.3 parts of PMA. The mixture is heated to 60° C. under inert gas and 0.001 part of DBTL is added. After about an hour, 30% of the NCO groups used have reacted. Then 3.15 parts of a polyethylene glycol ($M_n$=1000 g/mol) are added. Stirring is continued at 60° C. until a further 21% of the NCO groups used have reacted. Then 2.18 parts of triethanolamine are added and the mixture is stirred at 80° until the remaining NCO groups have been consumed by reaction. The product is of low viscosity and possesses a solids content of 30.5% and an amine number of 10 mg KOH/g.

Example 19

29.6 parts of polyisocyanate P1 admixed with 0.001 part of DBTL are heated to 80° C. and admixed slowly over one hour with 11.9 parts of polypropylene glycol monobutyl ether ($M_n$=700 g/mol). Then, rapidly, 12.7 parts of polyethylene glycol monomethyl ether ($M_n$=750 g/mol) and 25.2 parts of PMA are added. When 60% of the NCO groups used have been consumed by reaction, 3.4 parts of triethanolamine are added. When the remaining NCO groups have been consumed by reaction, the batch is diluted with 17.4 parts of dipropylene glycol monomethyl ether (DPM). The product is of medium viscosity and possesses a solids content of 43% and an amine number of 11 mg KOH/g.

Example 20

19.5 parts of polyisocyanate P1 are homogenized with 12.3 parts of intermediate A2 and 60.4 parts of PMA. The mixture is heated to 60° C. under inert gas and 0.002 part of DBTL is added. After about 2.5 hours, 30% of the NCO groups used have reacted. Then 5.6 parts of a polyethylene glycol ($M_n$=1000 g/mol) are added. Stirring is continued at 70° C. until a further 30% of the NCO groups used have reacted. Then 2.2 parts of triethanolamine are added and the mixture is stirred at 80° C. until the remaining 40% of the NCO groups used have been consumed by reaction. The product is of low viscosity and possesses a solids content of 30%, an amine number of 8 mg KOH/g and an OH number of 21 mg KOH/g.

Example 21

24 parts of polyisocyanate P1 are homogenized with 20 parts of intermediate A2 and also 26 parts of PMA and 24.4 parts of xylene. The mixture is heated to 65° C. under inert gas and 0.002 part of DBTL is added. After about an hour, 40% of the NCO groups used have reacted. Then 2.46 parts of a polyethylene glycol ($M_n$=1000 g/mol) are added. Stirring is continued at 65° C. until a further 11% of the NCO groups used have reacted. Then 3.37 parts of triethanolamine are added and the mixture is stirred at 70° C. until the remaining NCO groups have been consumed by reaction. The product is of low viscosity and possesses a solids content of 38%, an amine number of 11 mg KOH/g and an OH number of 28 mg KOH/g.

Example 22

12.9 parts of polyisocyanate P2 are homogenized with 24.6 parts of intermediate A1 and 48 parts of PMA. The mixture is heated to 60° C. under inert gas and 0.001 part of DBTL is added. After 1.5 hours, a third of the NCO groups used have reacted. Then 11.2 parts of a polyethylene glycol ($M_n$=1000 g/mol) are added. Stirring is continued at 70° C. until a further third of the NCO groups used have reacted. Then 3.3 parts of triethanolamine are added and the mixture is stirred at 70° C. until the remaining NCO groups have been consumed by reaction. The product is of medium viscosity and possesses a solids content of 52%, an amine number of 11 mg KOH/g and an OH number of 31 mg KOH/g.

Example 23

28.5 parts of polyisocyanate P3 are homogenized with 14.7 parts of intermediate A3, 12.2 parts of methoxypolyethylene glycol ($M_n$=750) and 2.2 parts of ethyl acetate. The mixture is heated to 80° C. under inert gas and 0.002 part of DBTL is added. After two hours, 60% of the NCO groups used have reacted. Then 1.5 parts of an imidazole are added and the mixture is stirred at 80° C. until the remaining 40% of the NCO groups used have been consumed by reaction. Then 13.2 parts of 1,2-propylene glycol are added and 16.2 parts of ethyl acetate are distilled off gently over vacuum. Subsequently, the batch is diluted with 26.4 parts of DPM. The product is of high viscosity and possesses a solids content of 52% and an amine number of 15 mg KOH/g.

Example 24

1000 parts of Example 9 are admixed with 23 parts of maleic anhydride (MAn). On heating under inert gas, the MAn dissolves. The mixture is stirred at 80° C. for 4 hours. Then 21 parts of PMA are added and the batch is cooled. The end product possesses a solids content of 52%, an acid number of 13 mg KOH/g, an amine number of 10 mg KOH/g and an OH number of 13 mg KOH/g.

Example 25

Non-Inventive, Comparative Example

In analogy to Example 1, 2.55 parts of N,N-diethylethanolamine are used instead of caprolactam. The solids content is 52%.

Example 26

28.1 parts of polyisocyanate P1 are homogenized with 22.8 parts of intermediate A5, 12.5 parts of A7 and 34 parts of PMA. The mixture is heated to 80° C. under inert gas and 0.003 part of DBTL is added. The mixture is stirred at this temperature for about one hour until 60% of the NCO groups used have reacted. Then a mixture of 1.5 parts of a N,N-dimethylaminopropane and 2 parts of triethanolamine is added and stirring is continued at 80° C. until all of the NCO groups have been consumed by reaction. The product possesses a solids content of 52%.

Example 27

29.6 parts of polyisocyanate P1, 25.2 parts of PMA and 0.001 part of DBTL are admixed dropwise, slowly, over an hour at 80° C. with 24 parts of polypropylene glycol monobutyl ether ($M_n$=700). When 60% of the NCO groups used have been consumed by reaction, 3.4 parts of triethanolamine are added. When the remaining NCO groups have been consumed by reaction, the batch is diluted with 17.4 parts of dipropylene glycol monomethyl ether (DPM). The product is of medium viscosity and possesses a solids content of 43% and an amine number of 11 mg KOH/g.

Example 28

15.7 parts of polyisocyanate P1 are homogenized with 9.9 parts of intermediate A2, 3.2 parts of intermediate A6 and 45.3 parts of PMA. The mixture is heated to 60° C. under inert gas and 0.001 part of DBTL is added. When 50% of the NCO groups used have reacted, 2.6 parts of 3-aminopropyltrimethoxysilane are added and stirring is continued at 60° C. until the remaining NCO groups have been consumed by reaction. The solids content is 30%.

Example 29

15.7 parts of polyisocyanate P1 are homogenized with 5 parts of intermediate A2, 4.5 parts of polyethylene glycol monomethacrylate ($M_n$=350, OH number 160 mg/g KOH), 0.001 part of DBTL and 45 parts of PMA and the mixture is heated to 60° C. When 50% of the NCO groups used have reacted, 3.2 parts of 3-aminopropyltriethoxysilane are added and stirring is continued at 60° C. until the remaining NCO groups have been consumed by reaction. The solids content is 30%.

Key:
P1=aromatic TDI polyisocyanurate having a free NCO content of 8.0% as a 51% strength solution in butyl acetate, e.g. Desmodur® IL, Bayer AG
P2=aliphatic polyisocyanate (HDI trimer) having a free NCO content of 21.8%, e.g. Desmodur® N3300, Bayer AG
P3=aromatic TDI polyisocyanurate having a free NCO content of 8.0%; as a 51% strength solution in ethyl acetate, e.g. Desmodur® IL EA, Bayer AG Use Examples
Adhesion Test with an Alkyd-Melamine Clearcoat
Clearcoat

| | |
|---|---|
| Alkyd resin, 70% strength in solvent naphtha; e.g.: manufacturer Vianova, Vialkyd AC 451 | 56 parts |
| Melamine resin, 55% strength in n-butanol/isobutanol; e.g.: Casella, Maprenal MF 600 | 34 parts |
| Solvent naphtha | 10 parts |
| | 100 parts |

Amount of addition of the example: 2% solids based on the total formulation
Application: 100 μm wet to steel panel
Drying: 10 min RT/20 min 140° C. forced air drying oven

| | Testing | | |
|---|---|---|---|
| Sample | Pendulum hardness | Xylene test | Cross-cut |
| Example 25 | 112 | 2 | GT5 |
| Example 2 | 113 | 0 | GT0 |
| Example 4 | 118 | 0 | GT1 |

Pendulum hardness König pendulum hardness
Cross-cut Cross-cut multiple-cutting blade assessment to DIN EN ISO 2431
Xylene test: 1 ml of xylene (in cotton ball) caused to act under glass for 24 h
Rating:
0 = coating film undamaged (possibly a few "pimples")
1 = slight damage (partial swelling and flaking of the exposed coating film)
2 = severe damage (complete swelling and flaking of the exposed coating film)

Use in a Paste System
Clearcoat (Alkyd/Melamine):

| | |
|---|---|
| Alkyd resin, 60% strength in solvent naphtha; e.g.: manufacturer Vianova, Vialkyd AC 451 | 74.0 parts |
| Melamine resin, 55% strength in n-butanol/isobutanol; e.g.: Casella, Maprenal MF 800 | 20.2 parts |
| Butanol | 0.8 part |
| Solvent naphtha | 4.5 parts |
| BYK 066; defoamer, manufacturer Byk Chemie GmbH | 0.3 part |
| BYK 310; polyester-modified polydimethylsiloxane, Byk Chemie GmbH | 0.2 part |
| | 100.0 parts |

Pigment Paste with Bayferroxrot 130 M:

| | |
|---|---|
| Laropal A81 (aldehyde resin, BASF), 65% strength in PMA | 25.0 parts |
| PMA (methoxypropyl acetate) | 3.0 parts |
| Inventive addition compound | 11.5 parts |
| Red iron oxide, e.g. Bayferroxrot 130 M | 60.0 parts |
| Silica, e.g. Aerosil 200 | 0.5 part |
| | 100.0 parts |

Dispersion: Dispermat CV/40 min/8000 rpm/40° C./1 mm beads 1:1

Pigment Paste with Novopermrot F3RK70:

| | |
|---|---|
| Laropal A81 65% strength in PMA | 26.0 parts |
| PMA | 14.8 parts |
| Inventive addition compound | 19.2 parts |
| Pigment Red 170, e.g. Novopermrot F3RK70 | 40.0 parts |
| | 100.0 parts |

Dispersion: Dispermat CV/40 min/10 000 rpm/40° C./1 mm beads 1:1

Pigment Paste with Kronos 2160:

| | |
|---|---|
| Laropal A81 65% strength in PMA | 22.0 parts |
| PMA | 10.1 parts |
| Inventive addition compound | 2.6 parts |
| Aerosil 200 | 0.3 part |
| Titanium dioxide, e.g. Kronos 2160 | 65.0 parts |
| | 100.0 parts |

Dispersion: Dispermat CV/30 min/8000 rpm/40° C./1 mm beads 1:1

Pigment Paste with Spezialschwarz 4:

| | |
|---|---|
| Laropal A81 65% strength in PMA | 23.50 parts |
| PMA | 22.90 parts |
| Inventive addition compound | 19.60 parts |
| Carbon black, e.g. Spezialschwarz 4 | 34.00 parts |
| (Degussa AG) | 100.00 parts |
| +10% PMA | |

Dispersion: Dispermat CV/60 min/10 000 rpm/40° C./1 mm beads 1:1 a) Mass Tone Blend of the Pigment Paste Bayferroxrot 130 M, Prepared with Examples 25, 3, 4 and 9

Mass tone blend of Bayferroxrot 130 M paste: (mixing in shaker/10 minutes at RT)

| | |
|---|---|
| Clearcoat | 27.6 parts |
| Pigment paste 130 M | 2.4 parts |
| Total: | 30.0 parts |

| | |
|---|---|
| Application: | 100 µm to steel panel |
| Drying: | 20 min RT, 25 min 140° C. paint drying oven |

Evaluation of the Cross-Cut:

| Additive: | Cross-cut: |
|---|---|
| Example 25 | GT 2 |
| Example 3 | GT 1 |
| Example 4 | GT 1 |
| Example 9 | GT 1 | b) Pigment Paste Spezialschwarz 4, Prepared with Examples 25 and 24

Evaluation of Paste Viscosity—Visual:

| Additive: | Evaluation: |
|---|---|
| Example 25 | 2-3 |
| Example 24 | 1 |

Rating: 1 = low viscosity, 3 = medium viscosity, 5 = pasty

Mass tone blend of pigment paste Spezialschwarz 4, prepared with Examples 25 and 24 (mixing in shaker/10 minutes at RT)

| | |
|---|---|
| Clearcoat | 28 parts |
| Spezialschwarz 4 paste | 2 parts |
| Total: | 30 parts |

| | |
|---|---|
| Application: | 100 µm to steel panel |
| Drying: | 20 min RT, 25 min 140° C. paint drying oven |

Evaluation of the Cross-Cut:

| Additive: | Cross-cut: |
|---|---|
| Example 25 | GT 4 |
| Example 24 | GT 0-1 | c) White Reduction of Pigment Paste Novopermrot F3RK70, Prepared with Examples 25, 5, 6, 7 and 9

White reduction of Novopermrot F3RK70 paste: (mixing in shaker/10 minutes at RT)

| | |
|---|---|
| Clearcoat | 19.8 parts |
| White paste TiO$_2$ Kronos 2160 | 9.2 parts |
| Novopermrot paste | 1.0 parts |
| Total: | 30.0 parts |

| Application: | Casting onto PE film |
| Drying: | 20 min RT, 25 min 140° C. paint drying oven |

Evaluation of Delta-E—of Rub-Out and of Gloss and Haze:

| Additive: | Rub-out (DE): | Gloss: | Haze: |
|---|---|---|---|
| Example 25 | 1.04 | 76 | 38 |
| Example 5 | 0.73 | 76 | 39 |
| Example 6 | 0.51 | 77 | 37 |
| Example 7 | 0.69 | 77 | 34 |
| Example 9 | 0.57 | 77 | 35 |

The invention claimed is:

1. Addition compounds and salts thereof, wherein the addition compounds are obtainable by reacting
   (a) one or more polyisocyanates having at least two isocyanate groups per molecule with
   (b) one or more compounds of the formula (I)

$$Y-(XH)_n \quad (I)$$

where
   XH is a group that is reactive towards isocyanates and
   Y is a monomeric or polymeric group that is not reactive towards isocyanates, that contains no tertiary amino groups and no hydrolysable silane groups and that comprises one or more aliphatic, cycloaliphatic and/or aromatic groups, that may optionally contain the heteroatoms O, S, Si and/or N and/or ether, urethane, carbonate, amide, siloxane and/or ester groups, and wherein hydrogen may optionally be replaced by halogen;
   and where
   n is 1, 2 or 3,
   the compound of the formula (I) possessing a number-average molar mass $M_n$ of less than 20 000 g/mol and not representing a compound which falls within the definition of component (c2),
   and
   where for at least 50 mol % of the compounds of the formula (I) it is the case that n is 1,
   with the proviso that 20% to 90% of the isocyanate groups of component (a) are reacted with the compounds of the formula (I),
   and
   (c) one or more compounds from the group consisting of
      (c1) a compound selected from the group consisting of triethanolamine, N-methyldiethanolamine, aminopropylmethylethanolamine, 3-(diethylamino)propane-1,2-diol, tetrakis(2-hydroxypropyl)ethylenediamine, bis(2-hydroxyethyl)dodecylamine, bis(2-hydroxyethyl)octadecylamine, and mixtures thereof,
      (c2) a blocking agent for isocyanate groups selected from the group consisting of lactams, malonic esters, alkyl acetoacetates, phenols, diisopropylamine, 1,2,4-triazole, and imidazole, excluding blocking agents comprising one or more groups that react irreversibly with isocyanate groups, and
      (c3) optionally compounds of the general formula (III)

$$Z-Q \quad (III)$$

in which
      Z is an organic basic radical having at least one tertiary amino group and contains no NCO-reactive groups, and
      Q is $NH_2$, OH or NHR, in which R is a linear or branched alkyl group having 1 to 18 carbon atoms,
   where, if desired, any hydroxyl groups present in the reaction product of (a), (b) and (c) are reacted with polycarboxylic acids having at least two carboxyl groups or their anhydrides in an amount such that at least 0.8 molecule of the polycarboxylic acid or of the polycarboxylic anhydride is used for each hydroxyl group to be reacted;
   subject to the proviso that at least 10% of the isocyanate groups of component (a) are reacted with component (c) and use is made as component (c) of at least 5 mol % of one or more of components (c1) and/or (c2), and that 0% to 50% of the isocyanate groups of component (a) are reacted with one or more components (c3);
   wherein the addition compounds contain no unsaturated groups.

2. The addition compounds according to claim 1, wherein Y contains the heteroatoms O, S, Si and/or N and/or ether, urethane, carbonate, amide, siloxane and/or ester groups, and halogen is substituted for hydrogen.

3. The addition compounds according to claim 1, where Z has one or more of the following definitions: A) an aliphatic and/or cycloaliphatic group having at least one tertiary amino group, or B) a heterocyclic group having at least one basic ring nitrogen atom that contains no hydrogen atom, it being possible for the heterocyclic group to be attached via an organic coupling group to the group Q.

4. The addition compounds according to claim 1, where at least two different compounds of the formula (I) are used.

5. The addition compounds and salts thereof according to claim 1, wherein the monofunctional compounds of the formula (I) are monohydroxy-functional polyethers, polyesters, polyether-polyesters and/or aliphatic and/or cycloaliphatic monoalcohols having 2 to 30 carbon atoms, some of whose hydrogen atoms may have been replaced by halogen and/or aryl radicals.

6. The addition compounds according to claim 1, wherein polyfunctional compounds of the formula (I) used are di- or trihydroxy-functional polyethers, polyesters or polyether-polyesters.

7. The addition compounds according to claim 1, wherein the polyisocyanates are trimerization products of diisocyanates based on hexamethylene diisocyanate, isophorone diisocyanate and/or tolylene diisocyanate.

8. A process for preparing the addition compounds according to claim 1, comprising reacting
   (a) one or more polyisocyanates having at least two isocyanate groups per molecule with
   (b) one or more compounds of the formula (I)

$$Y-(XH)_n \quad (I)$$

where
   XH is a group that is reactive towards isocyanates and
   Y is a monomeric or polymeric group that is not reactive towards isocyanates, that contains no tertiary amino groups and no hydrolysable silane groups and that comprises one or more aliphatic, cycloaliphatic and/or aromatic groups, that may optionally contain the heteroatoms O, S, Si and/or N and/or ether, urethane, carbonate, amide, siloxane and/or ester groups, and wherein hydrogen may optionally be replaced by halogen;
   and where
   n is 1, 2 or 3, the compound of the formula (I) possessing a number-average molar mass $M_n$ of less than 20 000 g/mol and not representing a compound which falls within the definition of component (c2), and where for at least 50 mol % of the compounds of the formula (I) it is the case that n is 1, with the proviso that 20% to 90% of the isocyanate groups of component (a) are reacted with the compounds of the formula (I), and (c) one or more compounds from the group consisting of (c1) a compound selected from the group consisting of triethanolamine, N-methyldiethanolamine, aminopropylmethylethanolamine, 3-(diethylamino)propane-1,2-diol, tetrakis(2-hydroxypropyl)ethylenediamine, bis(2-hydroxyethyl)dodecylamine, bis(2-hydroxyethyl)octadecylamine, and mixtures thereof, (c2) a blocking agent for isocyanate groups selected from the group consisting of lactams, malonic esters, alkyl acetoacetates, phenols, diisopropylamine, 1,2,4-triazole, and imidazole, excluding blocking agents comprising one or more groups that react irreversibly with isocyanate groups, and (c3) optionally compounds of the general formula (III)

$$Z-Q \qquad (III)$$

in which

Z is an organic basic radical having at least one tertiary amino group and contains no NCO-reactive groups, and Q is $NH_2$, OH or NHR, in which R is a linear or branched alkyl group having 1 to 18 carbon atoms, where, if desired, any hydroxyl groups present in the reaction product of (a), (b) and (c) are reacted with polycarboxylic acids having at least two carboxyl groups or their anhydrides in an amount such that at least 0.8 molecule of the polycarboxylic acid or of the polycarboxylic anhydride is used for each hydroxyl group to be reacted;

subject to the proviso that at least 10% of the isocyanate groups of component (a) are reacted with component (c) and use is made as component (c) of at least 5 mol % of one or more of components (c1) and/or (c2), and that 0% to 50% of the isocyanate groups of component (a) are reacted with one or more components (c3);

wherein the addition compounds contain no unsaturated groups.

9. The process for preparing an addition compound according to claim 8, where first component (a) is reacted with component (b) and then a reaction with component (c) takes place.

10. The process for preparing an addition compound according to claim 8, where component (a) is reacted first with compounds of the general formula (I) where n is 1 and then with compounds of the general formula (I) where n is 2 or 3.

11. A dispersant, dispersion stabilizer and/or wetting agent comprising the addition compounds of claim 1.

12. Paints, inks, paper coatings, leather and textile colours, pastes, pigment concentrates, ceramics, cosmetic preparations, casting compositions and/or moulding compositions based on synthetic semi-synthetic or natural macromolecular substances comprising addition compounds prepared by reacting (a) one or more polyisocyanates having at least two isocyanate groups per molecule with (b) one or more compounds of the formula (I)

$$Y-(XH)_n \qquad (I)$$

where

XH is a group that is reactive towards isocyanates and

Y is a monomeric or polymeric group that is not reactive towards isocyanates, that contains no tertiary amino groups and no hydrolysable silane groups and that comprises one or more aliphatic, cycloaliphatic and/or aromatic groups, that may optionally contain the heteroatoms O, S, Si and/or N and/or ether, urethane, carbonate, amide, siloxane and/or ester groups, and wherein hydrogen may optionally be replaced by halogen;

and where n is 1, 2 or 3, the compound of the formula (I) possessing a number-average molar mass $M_n$ of less than 20 000 g/mol and not representing a compound which falls within the definition of component (c2), and where for at least 50 mol % of the compounds of the formula (I) it is the case that n is 1, with the proviso that 20% to 90% of the isocyanate groups of component (a) are reacted with the compounds of the formula (I), and (c) one or more compounds from the group consisting of (c1) a compound selected from the group consisting of triethanolamine, N-methyldiethanolamine, aminopropylmethylethanolamine, 3-(diethylamino)propane-1,2-diol, tetrakis(2-hydroxypropyl)ethylenediamine, bis(2-hydroxyethyl)dodecylamine, bis(2-hydroxyethyl)octadecylamine, and mixtures thereof, (c2) a blocking agent for isocyanate groups selected from the group consisting of lactams, malonic esters, alkyl acetoacetates, phenols, diisopropylamine, 1,2,4-triazole, and imidazole, excluding blocking agents comprising one or more groups that react irreversibly with isocyanate groups, and (c3) optionally compounds of the general formula (III)

$$Z-Q \qquad (III)$$

in which

Z is an organic basic radical having at least one tertiary amino group and contains no NCO-reactive groups, and Q is $NH_2$, OH or NHR, in which R is a linear or branched alkyl group having 1 to 18 carbon atoms, where, if desired, any hydroxyl groups present in the reaction product of (a), (b) and (c) are reacted with polycarboxylic acids having at least two carboxyl groups or their anhydrides in an amount such that at least 0.8 molecule of the polycarboxylic acid or of the polycarboxylic anhydride is used for each hydroxyl group to be reacted;

subject to the proviso that at least 10% of the isocyanate groups of component (a) are reacted with component (c) and use is made as component (c) of at least 5 mol % of one or more of components (c1) and/or (c2), and that 0% to 50% of the isocyanate groups of component (a) are reacted with one or more components (c3);

wherein the addition compounds contain no unsaturated groups.

13. A pigment- and/or filler-comprising pigment concentrates, paints, pastes, and/or moulding compositions comprising the addition compounds of claim 12.

14. Coating solids in powder particle and/or fibre particle form comprising the addition compounds prepared by the process according to claim 8.

15. The coating solids in powder particle and/or fibre particle form of claim 14, wherein the solids in powder particle and/or fibre particle form are dispersible pigments and/or fillers.

16. A pigmented paint comprising the addition compounds of claim 12.

17. A pigmented paint on a substrate comprising the addition compounds of claim 12 wherein the pigmented paint has been baked, cured, or crosslinked after application to the substrate.

18. Solids in powder particle and/or fibre particle form, coated with an addition compound according to claim 1.

19. Solids in powder particle and/or fibre particle form according to claim 18, the solids in powder particle and/or fibre particle form being pigments and/or fillers.

\* \* \* \* \*